US010848643B2

(12) United States Patent
Takesue et al.

(10) Patent No.: US 10,848,643 B2
(45) Date of Patent: *Nov. 24, 2020

(54) COLOR CONVERSION PROCESSING APPARATUS, COLOR CONVERSION PROCESSING METHOD, CREATION METHOD OF COLOR CONVERSION LUT AND STORAGE MEDIUM

(71) Applicant: CANON KABUSHIKI KAISHA, Tokyo (JP)

(72) Inventors: Naoya Takesue, Tokyo (JP); Toshiyuki Dobashi, San Jose, CA (US); Tomokazu Yanai, Yokohama (JP); Hisashi Ishikawa, Urayasu (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/221,277

(22) Filed: Dec. 14, 2018

(65) Prior Publication Data
US 2019/0124231 A1 Apr. 25, 2019

Related U.S. Application Data

(63) Continuation of application No. PCT/JP2017/017592, filed on May 9, 2017.

(30) Foreign Application Priority Data

Jun. 24, 2016 (JP) .................................. 2016-125882

(51) Int. Cl.
*H04N 1/54* (2006.01)
*B41J 2/525* (2006.01)
(Continued)

(52) U.S. Cl.
CPC ................ *H04N 1/54* (2013.01); *B41J 2/525* (2013.01); *G06F 3/12* (2013.01); *G06T 1/00* (2013.01);
(Continued)

(58) Field of Classification Search
CPC .. H04N 1/52; H04N 1/54; H04N 1/60; H04N 1/6025; H04N 1/6016; H04N 1/6019; B41J 2/525; G06T 1/00
(Continued)

(56) References Cited

U.S. PATENT DOCUMENTS 5,579,132 A 11/1996 Takahashi et al. ........... 358/527
6,580,822 B1 * 6/2003 Takei .................. H04N 1/6025
345/600
(Continued)

FOREIGN PATENT DOCUMENTS

JP H06-139323 5/1994
JP 08275007 A * 10/1996
(Continued)

OTHER PUBLICATIONS

International Search Report dated Jun. 20, 2017 in counterpart International Application No. PCT/JP2017/017592.

*Primary Examiner* — Chad Dickerson
(74) *Attorney, Agent, or Firm* — Venable LLP

(57) ABSTRACT

The present invention is a color conversion processing apparatus that converts an input image signal value into an output value of an actual color material used in an image forming apparatus, and includes: a derivation unit configured to derive an output value corresponding to the input image signal value for a plurality of virtual color materials smaller in number than the number of actual color materials; and a conversion unit configured to convert the derived output values of the plurality of virtual color materials into
(Continued)

the output values of the actual color materials, and each of the plurality of virtual color materials has a density corresponding to each wavelength band obtained by dividing a wavelength range reproduced by the actual color materials being output into a plurality of wavelength bands, and the derivation unit derives the output value corresponding to the input image signal value based on the density corresponding to each of the wavelength bands for the plurality of virtual color materials.

24 Claims, 26 Drawing Sheets

(51) Int. Cl.
  *G06F 3/12* (2006.01)
  *G06T 1/00* (2006.01)
  *H04N 1/46* (2006.01)
  *H04N 1/60* (2006.01)
  *H04N 1/52* (2006.01)

(52) U.S. Cl.
  CPC ............... *H04N 1/46* (2013.01); *H04N 1/52* (2013.01); *H04N 1/60* (2013.01)

(58) Field of Classification Search
  USPC .................................................. 358/1.9, 2.1
  See application file for complete search history.

(56) References Cited

U.S. PATENT DOCUMENTS

| | | | |
|---|---|---|---|
| 7,139,096 B2 | 11/2006 | Ishikawa | 358/1.8 |
| 7,164,495 B1 | 1/2007 | Okamoto | 358/1.9 |
| 7,631,955 B2 | 12/2009 | Ishikawa | 347/15 |
| 8,482,798 B2 | 7/2013 | Taya et al. | 358/2.1 |
| 8,885,970 B2 | 11/2014 | Yanai | 382/274 |
| 9,168,757 B2 | 10/2015 | Yanai | H04N 1/54 |
| 10,187,553 B2* | 1/2019 | Takesue | G01J 3/462 |
| 2002/0113982 A1* | 8/2002 | Chang | H04N 1/6025 358/1.9 |
| 2005/0206926 A1* | 9/2005 | Tsuji | G06F 15/00 358/1.9 |
| 2007/0047032 A1* | 3/2007 | Kondo | H04N 1/6022 358/518 |
| 2008/0158580 A1* | 7/2008 | Okamoto | H04N 1/6025 358/1.9 |
| 2012/0243011 A1* | 9/2012 | Fukuda | G06F 15/00 358/1.9 |
| 2014/0355010 A1 | 12/2014 | Hara et al. | G06K 15/1881 |

FOREIGN PATENT DOCUMENTS

| | | |
|---|---|---|
| JP | H08-275007 | 10/1996 |
| JP | 2001-157073 | 6/2001 |
| JP | 2015-142250 | 8/2015 |

\* cited by examiner

COLOR CONVERSION PROCESSING APPARATUS, COLOR CONVERSION PROCESSING METHOD, CREATION METHOD OF COLOR CONVERSION LUT AND STORAGE MEDIUM

CROSS-REFERENCE TO RELATED APPLICATIONS

This application is a Continuation of International Patent Application No. PCT/JP2017/017592, filed May 9, 2017, which claims the benefit of Japanese Patent Application No. 2016-125882, filed Jun. 24, 2016, both of which are hereby incorporated by reference herein in their entirety.

BACKGROUND OF THE INVENTION

Field of the Invention

The present invention relates to image processing to convert an image signal into a signal corresponding to a plurality of color material components that a printer handles.

Background Art

A printer, represented by an ink jet printer or an electrophotographic printer, generates print data by receiving an image signal (normally, RGB color signal) as an input and converting the image signal into the amount of color material (e.g., ink of CMYK and toner) used in the printer. Depending on the setting of the color material amount of the printer, the image quality, such as gradation properties, color reproduction accuracy, and granularity, changes, and therefore, the conversion processing from an image signal into a color material amount is important.

This conversion processing is called color conversion processing and at present, the mainstream is the method that uses a three-dimensional LUT (Lookup Table). The three-dimensional LUT holds the color material amount of a printer corresponding to three-dimensional data of RGB, which is an input signal. In general, the three-dimensional LUT does not hold output values (color material amount) for all input values (RGB value), but holds only output values on grid points in the number of about 16 to 256 for each axis of RGB for the purpose of saving the storage capacity of an apparatus. For example, in the case where 16 grid points are arranged by dividing each axis into 15 portions, output values are held on the grid points in the number of 16×16×16=4,096. By using this three-dimensional LUT and the interpolation operation represented by tetrahedral interpolation, it is made possible to find the color material amount corresponding to an arbitrary RGB input value. In the interpolation operation, the color material amount is calculated by the product-sum operation of the color material amount information stored at adjacent grid points including the RGB value desired to be found and the coefficient (weighting) in accordance with the RGB value desired to be found and the information on the distance between the adjacent grid points. The results of the calculation of the color material amount by the interpolation operation are affected by the color material amount information stored at the grid point, and therefore, in order to improve the image quality, such as gradation properties, color reproduction accuracy, and granularity, the setting of the color material amount stored at the grid point becomes important. Regarding this point, Patent Document 1 has disclosed a technique to set a target color for each of a plurality of thinned grid points and to calculate the color material amount (ink amount) that implements each target color based on a color prediction model. In this technique, for the color material whose deterioration of gradation is conspicuous and whose optical density is relatively high, the color material amount is determined with priority so that there is no inflection point between grid points, and thereby, a three-dimensional LUT whose gradation properties and granularity in the shadow area are favorable is created.

CITATION LIST

Patent Literature

Patent Literature 1: Japanese Patent Laid-Open No. 2015-142250

SUMMARY OF THE INVENTION

However, in the technique described in Patent Document 1, for the color material whose optical density is relatively low, the color material amount is determined independently for each grid point based on the color prediction model. At this time, it is necessary to determine the color material amounts in the number corresponding to the number of color materials (e.g. four to twelve) used in the printer. In general, the level of difficulty of color prediction for a large number of color materials is high and an error from the actual color is produced. In the case where this error occurs in a fixed direction (the sign of the color difference is the same between grid points), the continuity of gradation is maintained, but in the case where this error occurs in different directions (the sign of the color difference is different between grid points), on a condition that the color material amount is calculated by the above-described interpolation calculation, there is a case where discontinuity of gradation occurs in an area crossing over a grid point. As a result of this, with the technique of Patent Document 1, there is a case where sufficient gradation properties are not obtained in the halftone area or highlight area compared to the shadow area.

Consequently, an object of the present invention is to provide color conversion processing capable of obtaining favorable gradation properties in the entire color space from the shadow area to the highlight area.

The color conversion processing apparatus according to the present invention is a color conversion processing apparatus that converts an input image signal value into an output value of an actual color material used in an image forming apparatus, and includes: a derivation unit configured to derive an output value corresponding to the input image signal value for a plurality of virtual color materials smaller in number than the number of actual color materials; and a conversion unit configured to convert the derived output values of the plurality of virtual color materials into the output values of the actual color materials, and each of the plurality of virtual color materials has a density corresponding to each wavelength band obtained by dividing a wavelength range reproduced by the actual color materials being output into a plurality of wavelength bands, and the derivation unit derives the output value corresponding to the input image signal value based on the density corresponding to each of the wavelength bands for the plurality of virtual color materials.

Further features of the present invention will become apparent by explanation of embodiments below given with reference to the attached drawings.

DESCRIPTION OF THE EMBODIMENTS

In the following, embodiments of the present invention are explained with reference to the drawings. The following embodiments are not intended to limit the present invention and all combinations of features explained in the present embodiments are not necessarily indispensable to the solution of the present invention.

First Embodiment

In the present embodiment, in order to enable color conversion in which discontinuity of gradation is less, in place of color materials (actual color materials) actually used in a printer, output values of virtual color materials for an input image signal value are derived first, whose each absorption wavelength band does not overlap another in principle. Specifically, the color material amount of the virtual color material is derived so that the relationship between the input image signal value and the output value of the virtual color material is one that increases monotonically and causes no inflection point to occur or whose number of inflection points is as small as possible (whose secondary differential does not become negative). After this, while the above-described relationship is maintained between the input image signal and the virtual color material amount, the conversion into the output value of the actual color material is performed. In the following, detailed explanation is given.

In the following explanation, as an image forming apparatus, an ink jet printer is supposed and explanation is given by taking an aspect as an example in which for an input image signal, the amount of ink used in the printer is derived. However, the present invention is not limited to an ink jet printer and it is also possible to apply the present invention to other printing schemes, such as a thermal dye-sublimation printer, a laser printer, and a UV curable ink jet printer.

(Configuration Example of Printing System)

Figure 1:
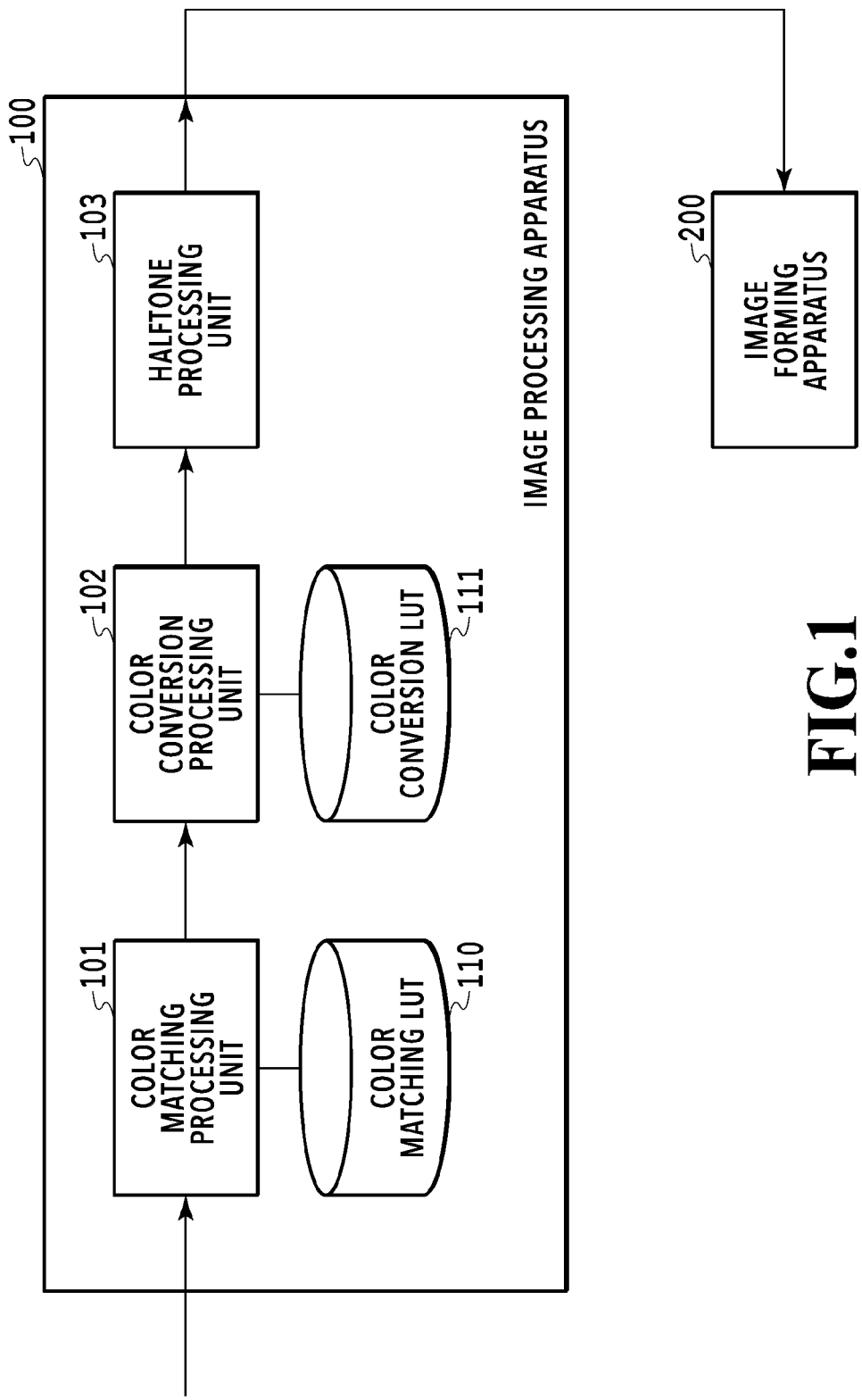
FIG. 1 is a block diagram showing an example of a configuration of a printing system.

FIG. 1 is a block diagram showing an example of a configuration of a printing system according to the present embodiment. The printing system in FIG. 1 includes, for example, an image processing apparatus 100, such as a general personal computer, and an image forming apparatus 200, such as the ink jet printer described above, and both are connected by a printer interface or a circuit. The image processing apparatus 100 includes a color matching processing unit 101, a color conversion processing unit 102, and a halftone processing unit 103 and each unit is implemented by a printer driver installed in the image processing apparatus 100.

In the image processing apparatus 100, printing-target image data is processed first in the color matching processing unit 101. This image data is, for example, 8-bit RGB color image data. The color matching processing unit 101 performs color matching processing for the input RGB image data and corrects the color of the RGB image. By this color matching processing, even in the case where an image forming apparatus or a printing medium having various color reproduction characteristics is used, it is possible to obtain systematic color reproduction. At the time of color matching processing, a three-dimensional color matching lookup table (LUT) 110 stored in the HDD and the like, not shown schematically, is referred to. In the color matching LUT 110, for example, RGB values are described only on 17×17×17 grid points and a value between grid points is derived by linear interpolation and the like. It may also be possible to implement the color matching processing by holding a matrix for color matching in place of an LUT and by performing matrix conversion for the input RGB value. The RGB image data for which the color matching processing has been performed is sent to the color conversion processing unit 102.

Figure 2:
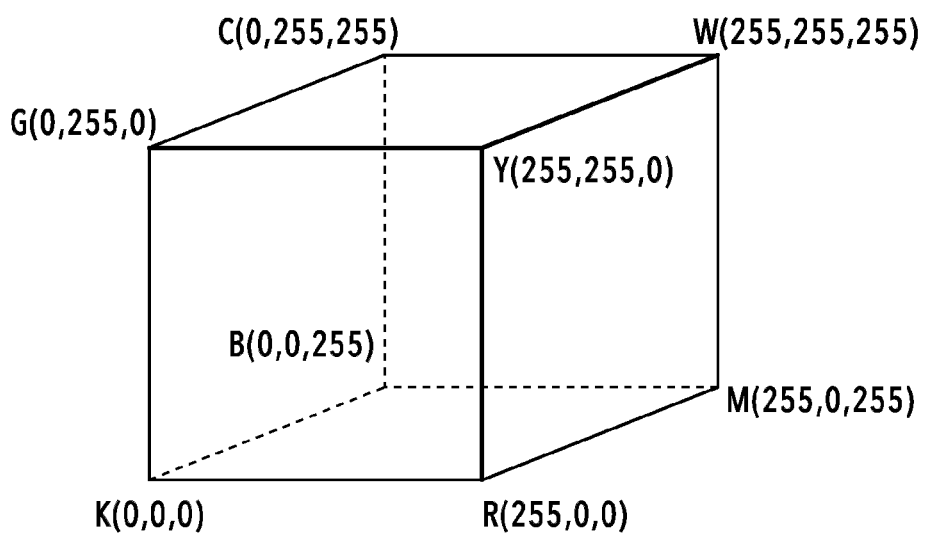
FIG. 2 is a diagram schematically showing a color conversion LUT.

The color conversion processing unit 102 generates each image (ink value image) corresponding to each ink used in the image forming apparatus 200 from the RGB image data for which the color matching processing has been performed. In this color conversion processing, a color conversion LUT 111 stored in the HDD and the like, not shown schematically, is referred to and the RGB value, which is an input image signal, is converted into an output value of ink. FIG. 2 is a diagram of an RGB cube (color cube) schematically representing a color conversion LUT. In the color conversion LUT, for each combination of input RGB values, an output value (ink amount) of each ink used in the image forming apparatus 200 is defined. Each of vertexes (0, 0, 0), (255, 0, 0), (0, 255, 0), (0, 0, 255), (0, 255, 255), (255, 0, 255), (255, 255, 0), and (255, 255, 255) of the color cube in FIG. 2 is a point corresponding to an input image signal. Each vertex (primary point) corresponds to a color of black (K), red (R), green (G), blue (B), cyan (C), magenta (M), yellow (Y), and white (W). Characteristics and a creation method of a color conversion LUT in the present embodiment will be described later.

The halftone processing unit 103 converts the ink value image of each color obtained by the color conversion processing unit 102 into a binary image (or image whose number of values is two or more and whose number of tone levels is smaller than the number of input tone levels) that can be handled by the image forming apparatus 200. As the halftone processing method, mention is made of the publicly known dither matrix method and error diffusion method. The binary image data generated by the halftone processing unit 103 is output to the image forming apparatus 200 and in the image forming apparatus 200, an image in accordance with the binary image data is formed on a printing medium, such as paper.

(Concept of Color Conversion Processing of the Present Embodiment)

As described above, in the color conversion processing unit 102, an input image signal value (here, RGB value) is converted into a value (ink value) indicating an ejection amount of ink, which is an actual color material. At this time, in the case where the ink values are determined so as to change smoothly for the consecutive input RGB values, the gradation of an image formed by the image forming apparatus 200 also becomes smooth. The degree of smoothness of the ink value is derived by a feature amount based on a difference in, for example, the primary differential or the secondary differential. On the other hand, the color matching processing is, as described previously, processing to obtain systematic color reproduction for a printer and a printing medium having various color reproduction characteristics. Consequently, the color matching LUT 110 to be used is determined so that the input RGB value and the color of an image to be formed match with each other. At this time, in the case where the color conversion LUT 111 is designed so that smooth ink values are obtained in the entire color area, it is made possible to obtain a printout whose color reproduction is guaranteed and whose gradation is smooth only by matching the input RGB value with the color of an image to be formed by the color matching LUT 110.

Based on the concept such as this, the present embodiment proposes a color conversion method capable of guaranteeing smoothness of the output gradation for consecutive input RGB values. Specifically, on the premise that the color matching processing unit 101 is in charge of the processing to match the input RGB value with the color of an image to be formed, the color conversion method is designed so as to derive the ink value for the input RGB value. Because of this, the color of an image to be formed in accordance with the color conversion method according to the present embodiment does not necessarily match with the color indicated by the input image signal. The ink values derived in accordance with the color conversion method in the present embodiment are associated with discrete input image signal values obtained by appropriately thinning those in the range of 16 to 256 for each of the RGB axes. Then, the ink values are held as the color conversion LUT 111 and referred to in the color conversion processing in the color conversion processing unit 102.

(Color Conversion Processing Procedure)

Figure 3:
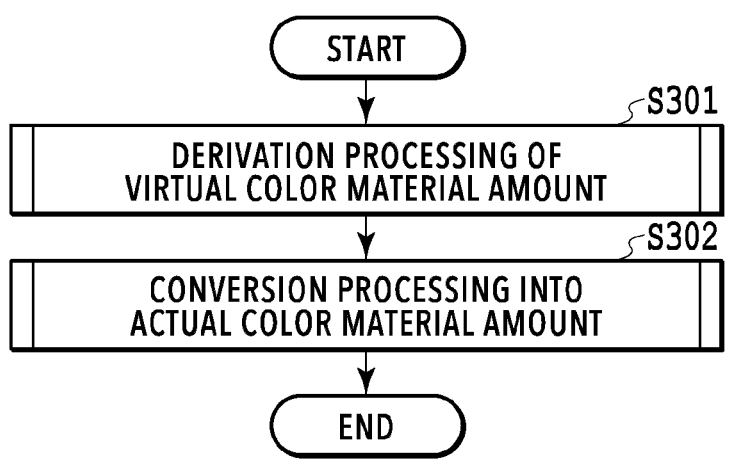
FIG. 3 is a flowchart showing a flow of color conversion processing according to the present embodiment.

FIG. 3 is a flowchart showing a flow of color conversion processing according to the present embodiment. In order to implement smooth output gradation by the color conversion processing, it is necessary for the output image density to change smoothly for the input image signal. That is, in the case where it is possible to implement color conversion processing by which the output image density changes smoothly for the input image signal, it is possible to attain smooth output gradation. However, the larger the number of inks used in a printer, the more difficult it becomes to derive the ink amount that causes the image density to change smoothly. Consequently in the present embodiment, virtual color materials in the number smaller than the number of inks used in the image forming apparatus 200 are defined and the virtual color material amount is found so that the characteristics of the output value of the virtual color material (virtual color material amount) for the input RGB value change smoothly in the entire color area (S301). As described above, it is desirable that the absorption wavelength bands corresponding to the respective color materials do not overlap one another. Then, the virtual color material amount that is found is converted into the ink value as the actual color material amount based on a conversion expression or a conversion table having substantially linear characteristics (S302). For example, the case is considered where the input RGB value is converted into the ink amount of cyan (c), magenta (m), yellow (y), black (k), light cyan (lc), light magenta (lm), gray (gy), and red (r). In this case, for a three-dimensional consecutive input signal (R, G, B), an eight-dimensional ink amount (Wc, Wm, Wy, Wk, Wgy, Wlc, Wlm, Wr) is derived in accordance with the procedure shown in FIG. 3.

(Virtual Color Material Amount)

Prior to detailed explanation of each of the above-described steps, the virtual color material amount is explained. In the present embodiment, it is assumed that the virtual color materials are inks of three colors, i.e., yellow, magenta, and cyan, which are the three primary colors of the subtractive color mixture. Here, a spectral reflectance Ref ($\lambda$) is divided into n wavelength blocks and the values obtained by averaging the spectral reflectance within each wavelength block are defined as block reflectances Ref1, Ref2, . . . , Refn. Further, values D1, D2, . . . , Dn obtained by converting the block reflectances Ref1, Ref2, . . . , Refn by expression (1) below are defined as block densities.

$$Dx = -\log 10(Refx) \quad \text{expression (1)}$$

Figure 4:
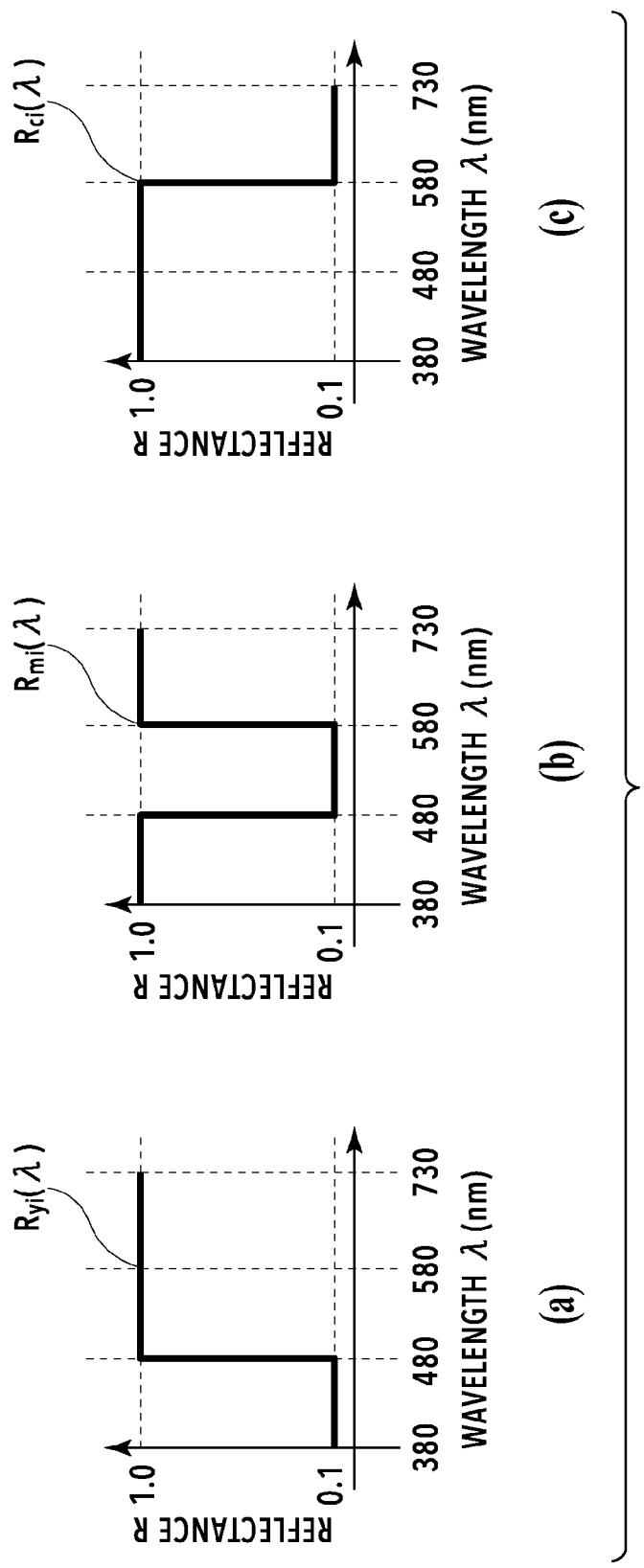
FIG. 4 is a diagram showing a spectral reflectance of a virtual color material.

In expression (1) described above, x is a subscript indicating 1 to n. In the present embodiment, the spectral reflectance Ref ($\lambda$) is divided into three wavelength blocks corresponding to the wavelength bands that the above-described three color inks mainly absorb. At this time, the block density corresponding to the wavelength band (380 to 480 nm) that the yellow ink mainly absorbs is taken to be Dy. Similarly, the block density corresponding to the wavelength band (480 to 580 nm) that the magenta ink mainly absorbs is taken to be Dm and the block density corresponding to the wavelength band (580 to 730 nm) that the cyan ink mainly absorbs is taken to be Dc. Further, in the present embodiment, virtual color materials having virtual spectral reflectances Ryi ($\lambda$), Rmi ($\lambda$), and Rci ($\lambda$) corresponding to the block densities Dy, Dm, and Dc, respectively are defined as yi, mi, and ci. FIG. 4(a) to FIG. 4(c) are each a graph representing the spectral reflectance of the virtual color material. FIG. 4(a) shows that the virtual color material yi absorbs only the wavelength band (380 to 480 nm) that the yellow ink mainly absorbs and reflects 100% of the light of wavelengths outside the wavelength band. Similarly, FIG. 4(b) shows that the virtual color material mi absorbs only the wavelength band (480 to 580 nm) that the magenta ink mainly absorbs and FIG. 4(c) shows that the virtual color material ci absorbs only the wavelength band (580 to 730 nm) that the cyan ink mainly absorbs.

Figure 5:
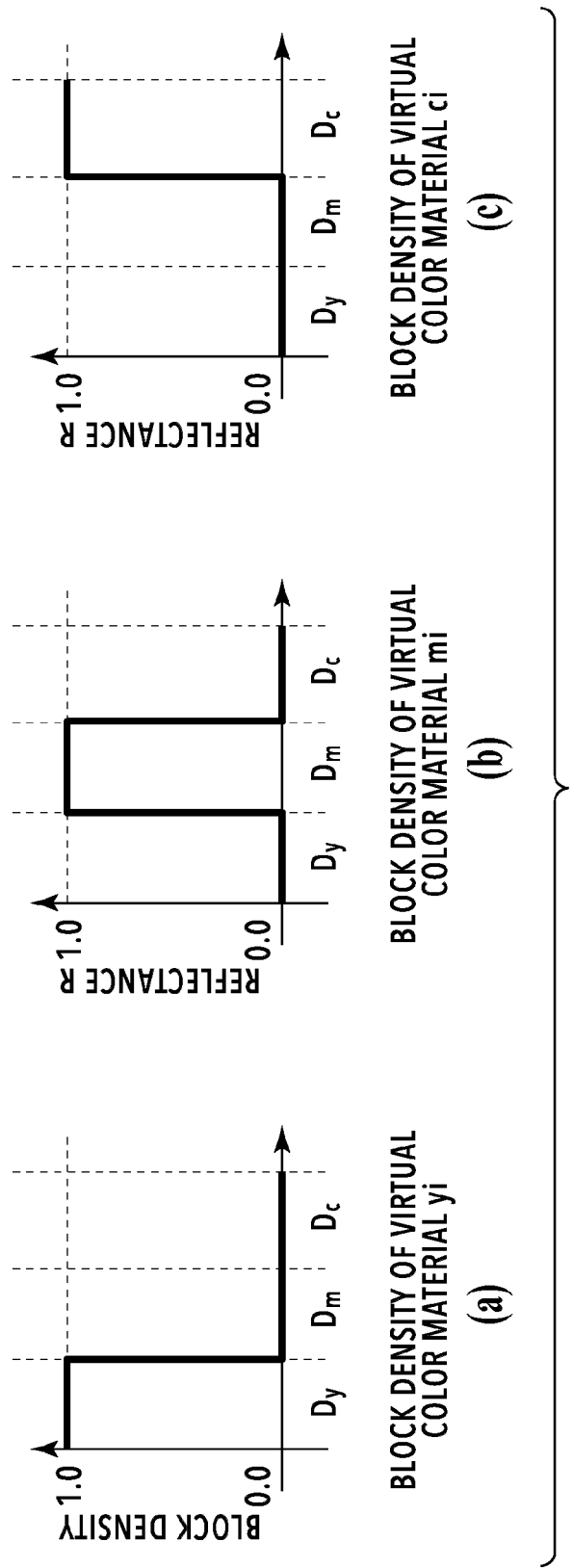
FIG. 5 is a diagram showing a block density of a virtual color material.

As described above, the block density of the virtual color material is found by expression (1) described above. For example, it is assumed that the reflectance of the wavelength band that each virtual color material mainly absorbs is 10%. At this time, the block density of the virtual color material yi is Dy=1.0, Dm=0.0, and Dc=0.0 (see FIG. 5(a)). Similarly, the block density of the virtual color material mi is Dy=0.0, Dm=1.0, and Dc=0.0 and the block density of the virtual color material ci is Dy=0, Dm=0.0, and Dc=1.0 (see FIG. 5(b) and FIG. 5(c)).

Here, it is already known that the thickness (amount) of the color material is proportional to the optical density as Lambert's law in the range where light scattering can be ignored. In the case where it is assumed that this law holds at all times for the virtual color materials yi, mi, and ci, on a recording medium, then, each block density of yi, mi, and ci, is proportional to the color material amount per unit area on the printing medium. That is, it is possible to perform linear conversion mutually between the arbitrary block densities Dy, Dm, and Dc and virtual color material amounts Vyi[%], Vmi[%], and Vci[%] in accordance with expression (2-1) to expression (2-3) below.

$$Vyi = \alpha\_y \times Dy \times 100 \quad \text{expression (2-1)}$$

$$Vmi = \alpha\_m \times Dm \times 100 \quad \text{expression (2-2)}$$

$$Vci = \alpha\_c \times Dc \times 100 \quad \text{expression (2-3)}$$

In expression (2-1) described above, $\alpha\_y$ is a constant of proportion in relation to the yellow density of the virtual color material yi and means that the larger the value thereof, the higher the yellow density per unit amount is. For example, in the case where the block density in a predetermined amount of material to be applied (hereinafter, applied material amount) V0 of the virtual color material yi is taken to be Dy0, it is possible to find the constant of proportion $\alpha\_y$ by $(100/V0) \times Dy0$. Similarly, in expression (2-2) described above, $\alpha\_m$ is a constant of proportion in relation to the magenta density of the virtual color material mi and in expression (2-3) described above, $\alpha\_c$ is a constant of proportion in relation to the cyan density of the virtual color material ci.

According to the hitherto given explanation, the arbitrary spectral reflectance Ref ($\lambda$) can be converted into the block densities Dy, Dm, and Dc by expression (1) described above after finding the block reflectance. Further, by expression (2-1) to expression (2-3) described above, it is possible to uniquely convert the block density into each of the virtual color material amounts Vyi, Vmi, and Vci. Then, in the present embodiment, the output value of each ink, which is the actual color material, is derived so that the above-described virtual color material amounts Vyi, Vmi, and Vci change smoothly for the input image signal (here, three channels of RGB). The spectral reflectance of the virtual color material is not limited to the above-described example and for example, it may also be possible to define the spectral reflectance of the virtual color material by narrowing the wavelength band in which the virtual color material has a density so that the virtual color material has a density only in part of the wavelength band (e.g., the virtual color material yi absorbs only wavelengths of 400 to 460 nm). Further, on the contrary, it may also be possible to define the spectral reflectance of the virtual color material so that two or more virtual materials have a density for the same wavelengths by widening the wavelength band. As described above, it is premised that the virtual color materials do not overlap in the absorption wavelength band. The reason is that in the case where there is an overlap, the specific wavelength area is evaluated twice, and therefore, there is a possibility that the color material amount becomes too excessive. Further, in the case where there is no overlap, conversion (calculation) between the input RGB value and the virtual color material amount and between the virtual color material amount and the actual color material amount is made easy. However, in the case where complicatedness of calculation is allowed and the light absorption characteristics of the normal distribution with the center of each wavelength band as a peak are possessed in place of the rectangular light absorption characteristics for the wavelength, on a condition that the degree of overlap is such a degree in which its skirt portions overlap slightly, the possibility that the color material amount is evaluated to be too excessive is slight. Consequently, in the wavelength band corresponding to each virtual color material, the existence of such an overlap in terms of that as restricted as above may be allowed.

Further, in the example described above, the reflectance Ref of each virtual color material is defined as 10% in the wavelength band that the virtual color material mainly absorbs, and as 100% in the other wavelength bands and the block density is set to 0.0 or 1.0. However, the reflectance and the block density of the virtual color material are not limited to the above and other values may be used. Of course, it may also be possible to apply a different reflectance to each of the virtual color materials yi, mi, and ci.

Further, the number of virtual color materials is not limited to three and may be three or more and less than the number of inks used in the image forming apparatus 200. In the case where the image forming apparatus 200 includes five color inks as in the present embodiment, for example, it may also be possible to define block densities that equally divide the wavelength range (e.g., 380 to 730 nm) reproduced by the ink, which is the actual color material, into four ranges and to define a virtual color material corresponding to each of the four ranges. Further, the width of the wavelength band may be a width of a wavelength band narrower than 380 to 730 nm or may be a width of a wider wavelength band including another wavelength band.

(Derivation Processing of Virtual Color Material Amount)

Figure 6:
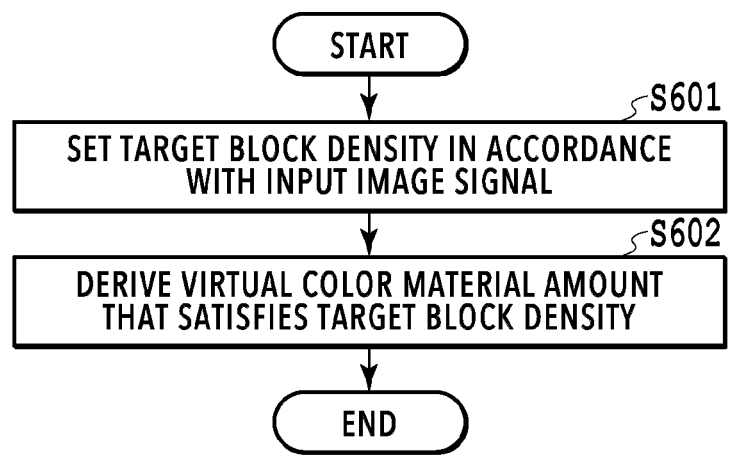
FIG. 6 is a flowchart showing details of virtual color material amount derivation processing according to a first embodiment.

Next, the virtual color material amount derivation processing at step 301 described above is explained. It is also possible to refer to this processing in different words as processing to separate an input image signal into the virtual color material amounts. FIG. 6 is a flowchart showing details of the virtual color material amount derivation processing according to the present embodiment.

First, at step 601, block densities T_Dy, T_Dm, and T_Dc that are targets for an input image signal are set, respectively. For example, it is assumed that an input image signal is input as an RGB value on an sRGB space. In this case, it is possible to find the target block densities T_Dy, T_Dm, and T_Dc by expressions (3-1) to (3-3) below.

$$T\_Dy(B)=-\log\{(B/B\_max)^{\wedge}2.2\} \text{ here}, B\neq 0 \quad \text{expression (3-1)}$$

$$T\_Dm(G)=-\log\{(G/G\_max)^{\wedge}2.2\} \text{ here}, G\neq 0 \quad \text{expression (3-2)}$$

$$T\_Dc(R)=-\log\{(R/R\_max)^{\wedge}2.2\} \text{ here}, R\neq 0 \quad \text{expression (3-3)}$$

Figure 7:
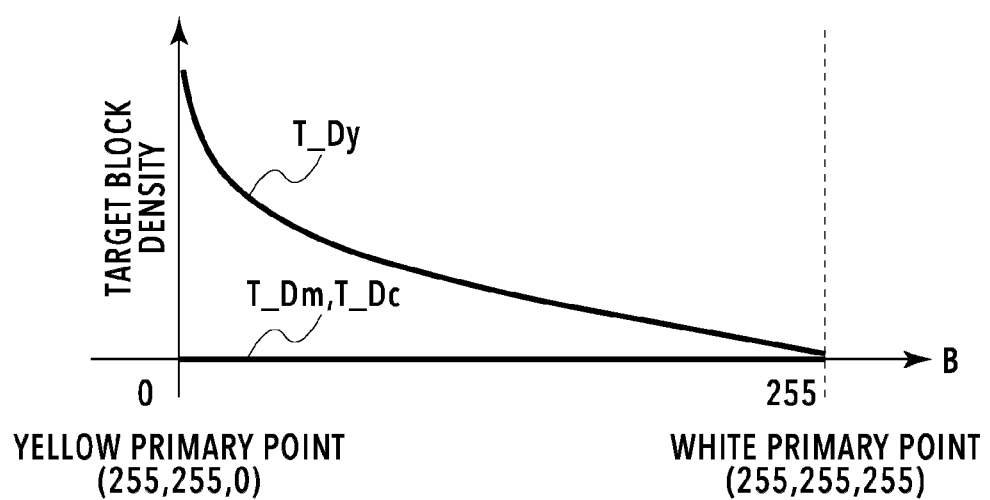
FIG. 7 is a diagram showing an example of a target block density on a W-Y line.

In expression (3-1) to expression (3-3) described above, B_max, G_max, and R_max are the maximum values that the input RGB value can take, respectively. Here, in the case where B=0, it is sufficient to set, for example, T_Dy (0)=T_Dy (1)+(T_Dy (1)−T_Dy (2))=−2 log {(1/B_max)^2.2}+log {(2/B_max)^2.2}. Similarly, in the case where G=0, it is sufficient to set T_Dm=−2 log {(1/G_max)¨2.2} +log {(2/G_{max})^2.2} and in the case where R=0, it is sufficient to set T_Dc=−2 log {(1/R_max)^2.2}+log {(2/R_max)^2.2}. It may also be possible to set those obtained by multiplying T_Dy, T_Dm, and T_Dc found by each expression described above by respective constants as the target block densities. FIG. 7 shows an example of the target block densities T_Dy, T_Dm, and T_Dc on a W-Y line that connects the white primary point and the yellow primary point.

Figure 8:
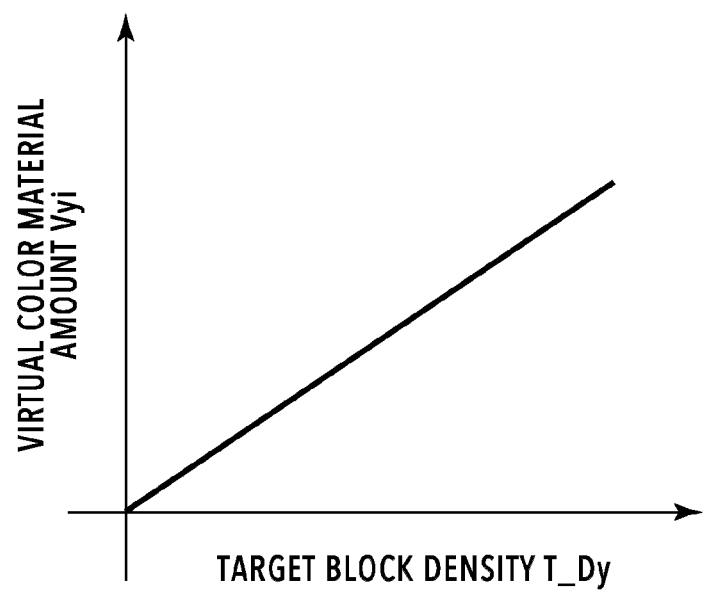
FIG. 8 is a diagram showing an example of a virtual color material amount that implements a target block density.

Next, at step 602, the virtual color material amounts that implement the target block densities T_Dy, T_Dm, and T_Dc set at step 601 are derived. As described previously, in the case where it is assumed that Lambert's law holds at all times for the virtual color materials yi, mi, and ci, by expression (2-1) to expression (2-3) described previously, it is possible to linearly convert the block densities Dy, Dm, and Dc into the amounts Vyi, Vmi, and Vci of the virtual color materials yi, mi, and ci, respectively. FIG. 8 is a graph representing a relationship between the target block density T_Dy and the virtual color material amount Vyi that implements T_Dy in the case of following the above, and it is known that there is a linear relationship between the target block density T_Dy and the virtual color material amount Vyi. The above is the contents of the virtual color material amount derivation processing.

(Conversion Processing into Actual Color Material Amount)

Following the above, the conversion processing from the virtual color material amount into the actual color material amount at step 302 described above is explained. In the present embodiment, in the conversion from the virtual color material amount into the actual color material amount, the actual color material amounts are determined so that at least one of the virtual color material amounts Vyi, Vmi, and Vci does not exceed the virtual color material amount that is the source of conversion. At this time, by performing conversion from the virtual color material amount into the actual color material amount using a linear combination model, the virtual color material amount is converted into the actual color material amount with the smoothness of the virtual color material amount being kept.

Figure 9:
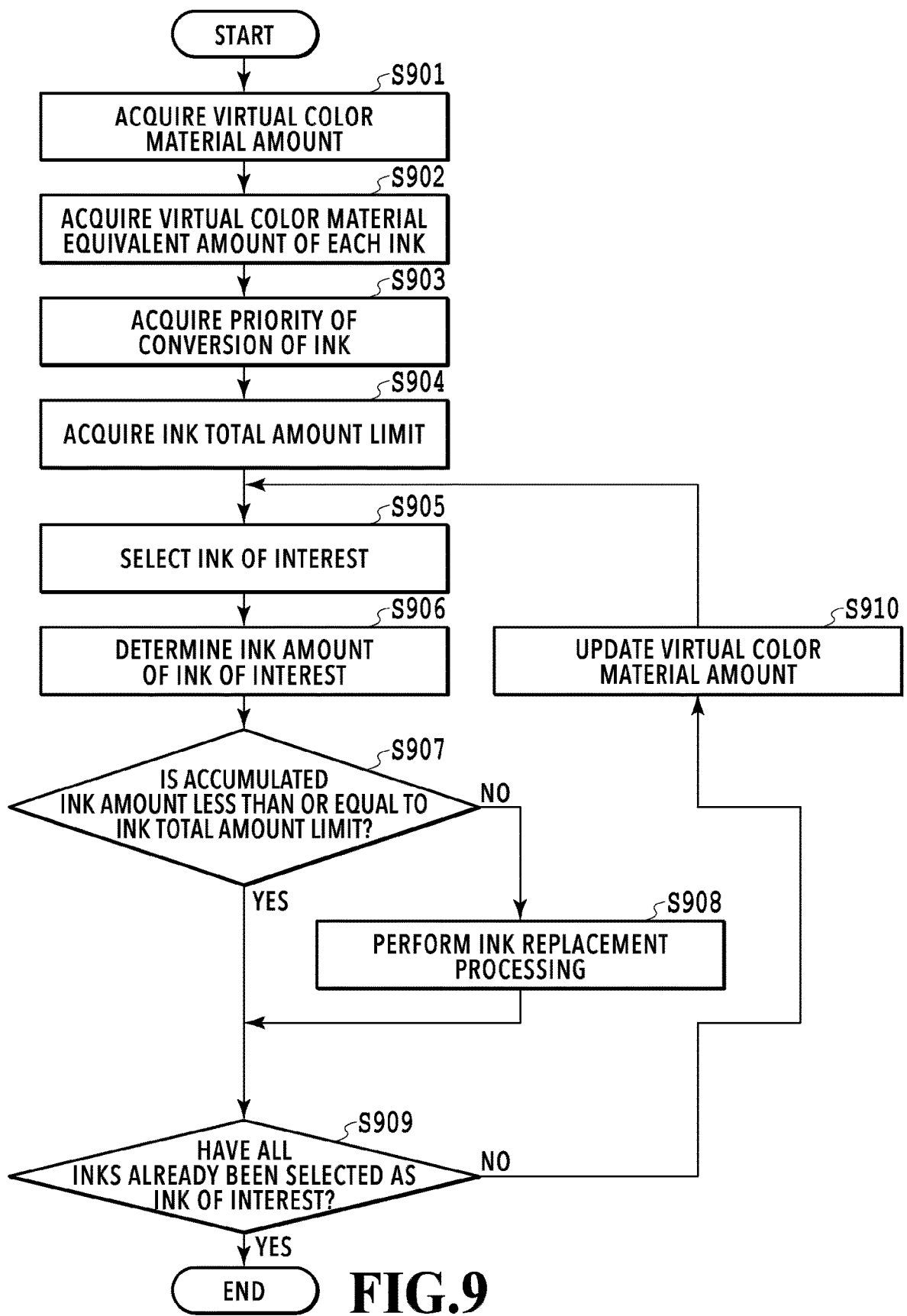
FIG. 9 is a flowchart showing a flow of processing of conversion into an actual color material (ink amount) according to the first embodiment.
Figure 10:
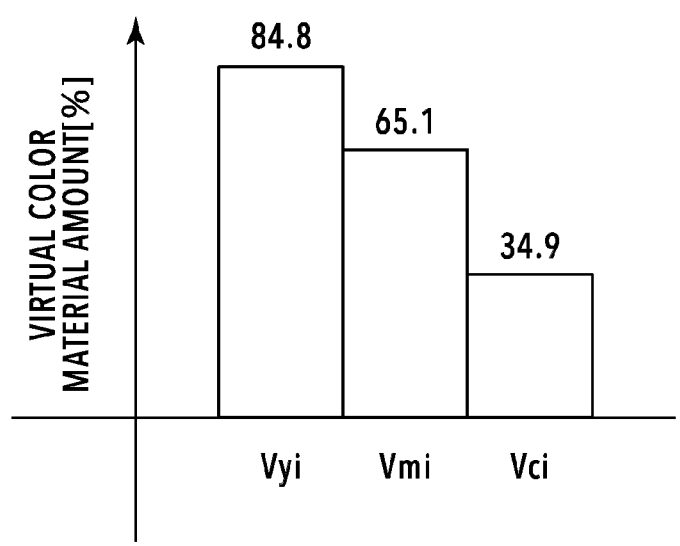
FIG. 10 is a diagram showing an example of a virtual color material amount that is the source of conversion.

FIG. 9 is a flowchart showing a flow of the conversion processing into the actual color material amount (ink amount) according to the present embodiment. First, at step 901, the virtual color material amounts Vyi, Vmi, and Vci that are the source of conversion are acquired. FIG. 10 shows an example of the virtual color material amounts Vyi, Vmi, and Vci that are the source of conversion. The virtual color material amounts shown in FIG. 10 are found as follows.

First, in the case where the RGB values as an input image signal are R=177, G=129, and B=105, the target block densities T_Dy=0.848, T_Dm=0.651, and T_Dc=0.349 are obtained from expressions (3-1) to (3-3) described above. On the other hand, in the case where it is assumed that the block density Dy of the virtual color material yi in the applied material amount V0=25[%] of each virtual color material is 0.25, i.e., Dy=0.25, the constant of proportion $\alpha\_y=(100/V0)\times Dy0=1.00$ is obtained. Similarly, it is assumed that the constants of proportion are $\alpha\_m=\alpha\_c=1.00$. Then, from the target block densities and the constants of proportion that are obtained, by expressions (2-1) to (2-3) described above, the virtual color material amounts Vyi=84.8[%], Vmi=65.1[%], and Vci=34.9[%] shown in FIG. 10 are obtained. For example, the virtual color material amount Vyi=84.8% means that the yellow ink as the virtual color material is applied to the corresponding pixel with a probability of 84.8% on the average and an ink dot is formed. In the present embodiment, a probability that a dot is formed in a pixel obtained by dividing one square inch into 1,200×1,200 portions is supposed.

At step 902 that follows, virtual color material amounts Vyi_x, Vmi_x, and Vci_x in the case where an ink x as the actual color material is represented by equivalent virtual color materials (hereinafter, virtual color material equivalent amounts) are acquired. As described previously, it is possible to uniquely convert an arbitrary spectral reflectance into the amounts Vyi, Vmi, and Vci of the virtual color materials yi, mi, and ci by expression (1) and expression (2-1) to expression (2-3) described above. That is, it is possible to uniquely convert the spectral reflectance in the case of a unit amount W0[%] of the ink x, which is arbitrary, into the virtual color material equivalent amounts Vyi_x, Vmi_x, and Vci_x. In the present embodiment, for all the inks x used in the image forming apparatus 200, as the equivalent values of the virtual color materials per unit amount of the ink x, Vyi_x, Vmi_x, and Vci_x are acquired. Specifically, the procedure is as follows.

First, the image forming apparatus 200 outputs print data whose applied material amount is W0[%]. Next, a spectral reflectance Refp (λ) at the printed portion and a spectral reflectance Ref0 (λ) at the paper white portion in the output printed matter are measured by using a colorimeter such as a spectral colorimeter. Further, by expression (4) below, the spectral reflectance Ref (λ) of the ink is calculated.

$$Ref(\lambda) = Refp(\lambda)/Ref0(\lambda) \qquad \text{expression (4)}$$

Figure 11:
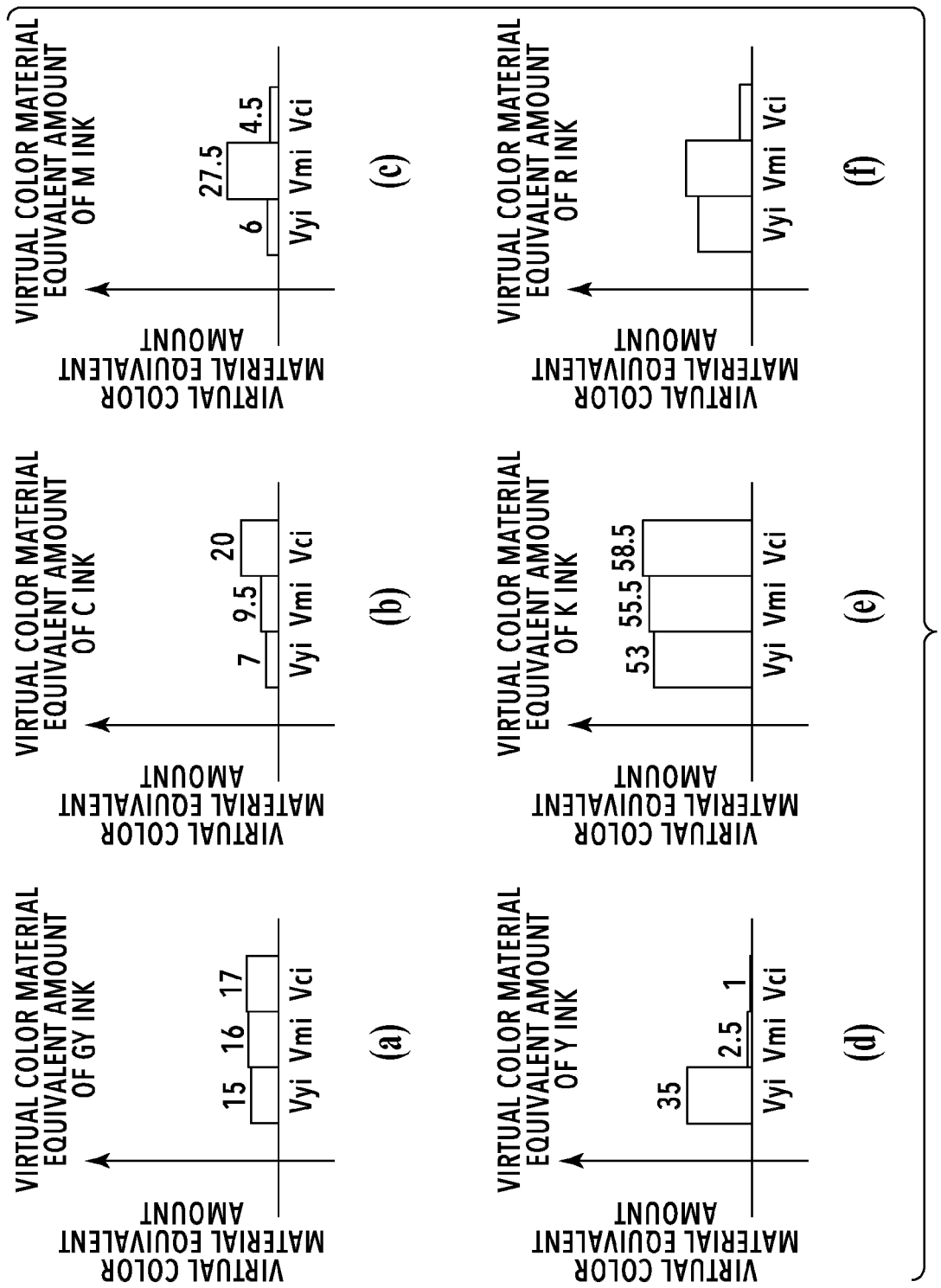
FIG. 11 is a diagram showing an example of each ink in the case where each ink is represented by equivalent virtual color materials.

After this, from the obtained spectral reflectance Ref (λ), the virtual color material equivalent amounts Vyi_x, Vmi_x, and Vci_x per unit applied material amount W0[%] are found by expression (1) and expression (2-1) to expression (2-3) described previously. The above-described processing is performed for all the inks (here, five colors) used in the image forming apparatus 200. Alternatively, it may also be possible to read the virtual color material equivalent amounts of each ink held in the form of a table or the like by acquiring in advance the virtual color material equivalent amounts of each ink by the above-described method. FIG. 11(*a*) to FIG. 11(*e*) each show an example of the virtual color material equivalent amounts of each ink. FIG. 11(*a*) shows the virtual color material equivalent amounts of the gray ink per unit applied material amount W0[%] described above. Similarly, FIG. 11(*b*) shows the virtual color material equivalent amounts per unit applied material amount W0[%] of the cyan ink, FIG. 11(*c*) shows those of the magenta ink, FIG. 11(*d*) shows those of the yellow ink, and FIG. 11(*e*) shows those of the black ink, respectively. In this example, it is assumed that the virtual color material equivalent amounts are Vyi=84.8 [%], Vim=65.1 [%], and Vci=34.9 [%]. Then, it is also assumed that each of the block densities T_Dy, T_Dm, and T_Dc in the case of the unit applied material amount W0=25.0[%] of each of gray, cyan, magenta, yellow, and black inks is as follows.

TABLE 1

|    | T_Dy | T_Dm  | T_Dc  |
|----|------|-------|-------|
| gy | 0.15 | 0.16  | 0.17  |
| c  | 0.07 | 0.095 | 0.2   |
| m  | 0.06 | 0.275 | 0.045 |
| y  | 0.35 | 0.025 | 0.01  |
| k  | 0.53 | 0.555 | 0.585 |

At this time, the virtual color material equivalent amounts of each ink that are obtained from the above-described block density are as in the following table from expression (2-1) to expression (2-3) described above and the virtual color material equivalent amounts coincide with those in FIG. 11(*a*) to FIG. 11(*e*).

TABLE 2

|    | Vyi | Vmi  | Vci  |
|----|-----|------|------|
| gy | 15  | 16   | 17   |
| c  | 7   | 9.5  | 20   |
| m  | 6   | 27.5 | 4.5  |
| y  | 35  | 2.5  | 1    |
| k  | 53  | 55.5 | 58.5 |

At subsequent steps 903 to 910, based on the virtual color material equivalent amounts of each ink acquired at step 902, the virtual color material amounts are converted into a combination of the ink amounts as the actual color material amounts. Specifically, each ink amount W is found so that the virtual color material equivalent amounts of each ink coincide with the target virtual color material amounts Vyi_x, Vmi_x, and Vci_x.

At step 903, information on the priority of conversion of each ink used in the image forming apparatus 200 is acquired. The priority of conversion is set so that, for example, the ink whose density is lower is given higher priority. Specifically, it is sufficient to acquire the maximum value of each of the virtual color material equivalent amounts Vyi_x, Vmi_x, and Vci_x acquired at step 902 and to set the priority so that the ink whose maximum value is lower is given higher priority. For example, the priority of conversion in the case of each ink shown in Table 2 described above, the priority is high in the order of gray, cyan, magenta, yellow, and black. In the case where the priority of conversion is set as described above, the conversion into the ink whose density is low is performed with priority, and therefore, it is possible to implement color conversion excellent in granularity. Of course, the determination method of the priority of conversion is not limited to the above-described example. For example, it may also be possible to determine the priority of conversion based on an average value in place of the maximum value of the virtual color material equivalent amount. Alternatively, it may also be possible to determine the priority of conversion based on the publicly known optical density OD in place of the virtual color material equivalent amount. Further, on the contrary to the above-described example, it may also be possible to set the priority of conversion so that the ink whose density is higher is given higher priority. In this case, the conversion into the ink whose density is high is performed with priority, and therefore, it is possible to reduce the ink total amount. As described above, at the time of determining the priority of conversion, only by changing the priority of the high-density ink and the low-density ink, it is possible to implement conversion characteristics optimum to a desired requirement, such as granularity, ink consumption, sharpness, and coloring of gloss. For example, in the case where priority is given to sharpness, priority is given to the high-density ink and in the case where priority is given to coloring of gloss, it is sufficient to give high priority to the ink whose hue is different from that of the conversion-target color. Due to this, it is made possible to suppress the specularly reflected light from becoming slightly magenta, which is caused by, for example, the yellow ink whose wavelength dependence is comparatively small being added to an image area formed by the cyan ink.

At step 904, the value of a limit to the ink total amount (Max_W[%]) determined in advance is acquired. This value of the total amount limit Max_W is given by a designer. For example, the limit value of the total amount is determined by the designer outputting a plurality of patches different in ink amount by the image forming apparatus 200 and finding the amount of ink that a printing medium can absorb without any problem. Alternatively, it may also be possible to determine the limit value of the total amount based on a table or a calculation expression by determining the table in which information on the amount of reduction in ink, the printing speed, and the number of print passes is described for each printing medium or the calculation expression.

At step 905, in accordance with the priority of conversion acquired at step 903, an ink on which attention is to be focused (ink of interest n) is selected from among all the inks. That is, from the inks used by the image forming apparatus 200, the ink that has not been selected yet as the ink of interest and whose priority is the highest is determined to be the ink of interest n.

A step 906, an ink amount Wn of the ink of interest n selected at step 905 is determined in accordance with Lambert's law. At this time, the ink amount of the ink of interest is determined so that at least one of the virtual color material amounts Vyi, Vmi, and Vci coincides with the virtual color material amount that is the source of conversion acquired at step 901. More specifically, ink amounts Wn_y, Wn_m, and Wn_c with which the virtual color material amounts Vyi, Vmi, and Vci are caused to coincide in the ink of interest n are found by using expression (5-1) to expression (5-3) below.

$$Wn\_y = W0/Vyi\_n \times Vyi \quad \text{expression (5-1)}$$

$$Wn\_m = W0/Vmi\_n \times Vmi \quad \text{expression (5-2)}$$

$$Wn\_c = W0/Vci\_n \times Vci \quad \text{expression (5-3)}$$

In expression (5-1) to expression (5-3) described above, Vyi_n, Vmi_n, and Vmi_n are the virtual color material equivalent amounts of the ink of interest n, respectively. Here, expression (5-1) described above is based on Lambert's law and in the case where it is assumed that $\beta n\_y = W0/(100 \times Vyi\_n)$, it is possible to transform expression (5-1) into expression (5-1') below. In this case, $\beta n\_y$ is a constant. Similarly, it is possible to transform expression (5-2) and expression (5-3) described above into expression (5-2') and expression (5-3') below, respectively. Here, it is assumed that $\beta n\_m = W0/(100 \times Vmi\_n)$ and $\beta n\_c = W0/(100 \times Vci\_n)$.

$$Wn\_y = \beta n\_y \times Vyi \quad \text{expression (5-1')}$$

$$Wn\_m = \beta n\_m \times Vmi \quad \text{expression (5-2')}$$

$$Wn\_c = \beta n\_c \times Vci \quad \text{expression (5-3')}$$

In expression (5-1') described above, $\beta n\_y$ is a value relating a ratio of the virtual color material Vyi_n equivalent to the ink of interest n in the predetermined amount W0[%] to the virtual color material amount Vyi included in the virtual color material yi in the same amount (W0[%]). That is, it is shown that the larger $\beta n\_y$, the smaller Vyi_n equivalent to the ink of interest n in the predetermined amount is. Consequently, it is meant that the larger $\beta n\_y$, the larger the ink amount Wn becomes, which causes the virtual color material amount that is the source of conversion to coincide with the virtual color material equivalent amount of the ink of interest n.

In this manner, from the ink amounts Wn_y, Wn_m, and Wn_c found from expression (5-1) to expression (5-3) or expression (5-1') to expression (5-3') described above, the ink amount Wn of the ink of interest is determined in accordance with the ink characteristics of the ink of interest n. Specifically, the maximum value is acquired for the virtual color material equivalent amounts Vyi_n, Vmi_n, and Vci_n of the ink of interest n is acquired and the ink amount that causes the virtual color material equivalent amount having the maximum value to coincide with the virtual color material amount that is the source of conversion is selected as Wn. For example, in the case where Vyi_n>Vmi_n and Vmi_n>Vci_n, Wn_y corresponding to Vyi_n whose virtual color material equivalent amount is the largest is taken to be the ink amount Wn of the ink of interest n. By doing so, the amount of the main virtual color material of the ink of interest n (e.g., in the case where the ink of interest is the yellow ink, the virtual color material amount Vyi) coincides with the virtual color material amount that is the source of conversion. Alternatively, the minimum value of Wn_y, Wn_m, and Wn_c is taken to be the ink amount Wn of the ink of interest n. By doing so, in the case where a plurality of main virtual color materials exists, such as the black ink, it is possible to determine the ink amount by taking into consideration each virtual color material amount. It may also be possible to find the maximum virtual color material amount from the virtual color material amounts acquired at step 901 and to select the ink amount that causes the virtual color material amount to coincide with the virtual color material that is the source of conversion as Wn irrespective of the ink characteristics.

At step 907, whether or not the accumulated value of the ink amounts determined for the ink of interest is within the range of the ink total amount limit Max_W acquired at step 904 is determined. Specifically, a total sum Sum_W of the ink amounts determined up to the present point in time and the ink total amount limit Max_W are compared and whether the total amount Sum_W is smaller than or equal to the total amount limit Max_W is determined. In the case where the results of the determination indicate that the total sum Sum_W is smaller than or equal to the total amount limit Max_W, the processing advances to step 909. On the other hand, in the case where the total sum Sum_W is larger than the total amount limit Max_W, the processing advances to step 908.

At step 908, ink replacement processing is performed. This processing is processing to convert the ink whose priority of conversion is high into the ink whose priority is lower and which exhibits substantially the same hue so that the accumulated ink amount (total sum Sum_W) and the ink total amount limit Max_W become equal to each other. At this time, the replacement is performed so that the virtual color material amount before the replacement substantially coincides with that after the replacement. By this processing, for example, the gray ink whose priority is high is replaced with the black ink whose priority is lower and which exhibits substantially the same hue. The replacement of the gray ink with the black ink is performed by using expression (6-1) and expression (6-2) below.

$$Wgy' = Wgy - (Sum\_W - Max\_W) \times \gamma/(\gamma - 1) \quad \text{expression (6-1)}$$

$$Wk' = Wk + (Sum\_W - Max\_W)/(\gamma - 1) \quad \text{expression (6-2)}$$

In expressions (6-1) and (6-2) described above, Wgy and Wk are the ink amount of the gray ink before the replacement and that of the black ink before the replacement, respectively, and Wgy' and Wk' are the ink amount of the gray ink after the replacement and that of the black ink after the replacement, respectively. Here, the ratio between the virtual color material equivalent amounts Vyi_n, Vmi_n, and Vci_n is regarded as substantially the same and the gray ink is replaced with the black ink by using a ratio of replacement γ. The ratio of replacement γ is found by, for example, V_k/V_gy. Here, V_k is the total sum of virtual color material equivalent amounts Vyi_k, Vmi_k, and Vci_k of the black ink and V_gy is the total sum of virtual color material equivalent amounts Vyi_gy, Vmi_gy, and Vci_gy. As the ratio of replacement γ, for example, it may also be possible to acquire the maximum value of the virtual color material equivalent amounts Vyi_n, Vmi_n, and Vci_n and to use the ratio of the virtual color material equivalent amount having the maximum value. In particular, in each of the cyan, magenta, and yellow inks, the ratio of the main virtual color material equivalent amount is important, and therefore, it is desirable to use the ratio of the virtual color material equivalent amount having the maximum value.

It is also possible to hold in advance combinations of ink amounts that exhibit substantially the same hue as that of gray and to perform replacement based on the ratio of the combination. For example, it may also be possible to hold combinations of the ink amounts of the black, cyan, magenta, and yellow inks, which substantially coincide with the virtual color material equivalent amounts of the gray ink in the ink amount W0[%] and to replace the gray ink with a combination of the black, cyan, magenta, and yellow inks so that the total sum Sum_W and the total color material amount limit Max_W become equal to each other. By the replacement processing as described above, the accumulated value of the ink amounts is controlled so as not to exceed the value of the ink total amount limit Max_W.

At step 909, whether or not all the inks used in the image forming apparatus 200 have already been selected as the ink of interest is determined. In the case where all the inks have already been selected as the ink of interest, this processing is terminated. On the other hand, in the case where the ink that has not been selected yet as the ink of interest exists, the processing advances to step 910.

At step 910, the virtual color material amounts that are the source of conversion are updated. Specifically, the virtual color material amounts are updated to virtual color material amounts $Vyi''$, $Vmi''$, and $Vci''$ obtained by using expression (7-1) to expression (7-3) below.

$$Vyi''=Vyi-Vyi' \qquad \text{expression (7-1)}$$

$$Vmi''=Vmi-Vmi' \qquad \text{expression (7-2)}$$

$$Vci''=Vci-Vci' \qquad \text{expression (7-3)}$$

In expression (7-1) to expression (7-3) described above, $Vyi$, $Vmi$, and $Vci$ are the virtual color material amounts acquired at step 901. Further, each of $Vyi'$, $Vmi'$, and $Vci'$ is the total sum of the virtual color material equivalent amounts, which is calculated from each ink amount W and the virtual color material equivalent amount obtained at step 906 or at step 908. For example, $Vyi'$ is $\Sigma Wx+Vyi\_x$. It is assumed that the values of the virtual color material equivalent amounts $Vyi''$, $Vmi''$, and $Vci''$ after the updating are taken to be values larger than or equal to 0 and in the case where the value becomes a negative value as the results of using expression (7-1) to expression (7-3) described above, the virtual color material equivalent amount after the updating is set to 0. $Vyi''$, $Vmi''$, and $Vci''$ after the updating obtained as described above are used as the virtual color material amounts that are the targets of coincidence in the processing of the next ink of interest n.

Here, the processing at each of step 905 to step 910 described above is explained by showing a specific example. In the following explanation, it is assumed that the virtual color material amounts that are the source of conversion, which are acquired at step 901, are $Vyi=84.8[\%]$, $Vmi=65.1[\%]$, and $Vci=34.9[\%]$ shown in FIG. 10 described previously. Further, it is also assumed that the virtual color material equivalent amounts acquired at step 902 are values shown in FIG. 11(a) to FIG. 11(e) described previously. Furthermore, it is also assumed that the priority of ink conversion acquired at step 903 is in the order of the gray, cyan, magenta, yellow, and black inks from the highest priority. Still furthermore, it is assumed that the ink total amount limit Max_W=100[%].

Figure 12:
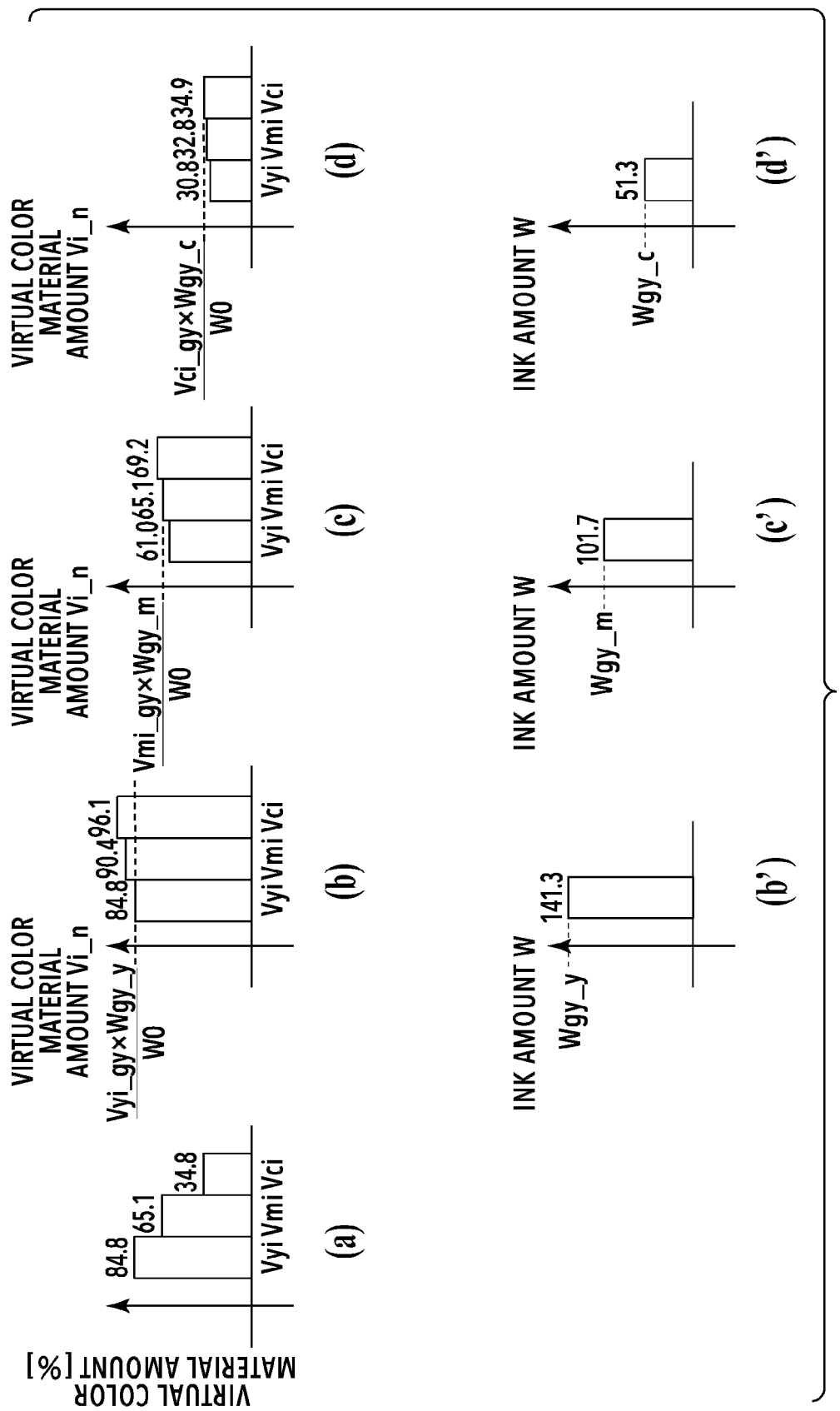
FIG. 12 is a diagram showing a determination procedure of an output value of a gray ink.

First, in accordance with the priority of conversion, the gray ink is selected as the ink of interest (S905). Next, the ink amount Wgy of the gray ink, which is the ink of interest, is determined (S906). FIG. 12(a) to FIG. 12(d') are diagrams showing a specific determination procedure. FIG. 12(a) shows the virtual color material amounts that are the source of conversion acquired at step 901 and as described above, $Vyi=84.8[\%]$, $Vmi=65.1[\%]$, and $Vci=34.9[\%]$. FIG. 12B-a shows the virtual color material amounts $Vyi$, $Vmi$, and $Vci$ by the gray ink in the case where the virtual color material amount $Vyi$ is caused to coincide by the virtual color material equivalent amounts of the gray ink shown in FIG. 11(a). An ink amount $Wgy\_y$ that causes the virtual color material amount $Vyi$ to coincide at this time is shown in FIG. 12(b'). That is, the ink amount $Wgy\_y=W0/Vyi\_gy \times Vyi=25.0/15.0\times 84.4=141.3[\%]$ that is found by using expression (5-1) described previously so that the virtual color material amount $Vyi$ shown in FIG. 12(a) is obtained is that shown in FIG. 12(b'). At this time, $\beta n\_y=W0/Vyi\_gy=25.0/15.0=1.67$, and therefore, the virtual color material amounts in the case where the ink amount $Wgy\_y=141.3[\%]$ will be $Vyi=84.8[\%]$, $Vmi=90.4[\%]$, and $Vci=96.1[\%]$ as shown in FIG. 12(b). Similarly, the virtual color material amounts in the case where the virtual color material amount $Vmi$ is caused to coincide are shown in FIG. 12(c) and an ink amount $Wgy\_m$ is shown in FIG. 12(c'). Further, the virtual color material amounts in the case where the virtual color material amount $Vci$ is caused to coincide are shown in FIG. 12(d) and an ink amount $Wgy\_c$ is shown in FIG. 12(d'). Here, it is assumed that the minimum value of $Wgy\_y$, $Wgy\_m$, and $Wgy\_c$ is used as the ink amount Wgy of the gray ink. In this case, $Wgy\_y=141.3[\%]>Wgy\_c=51.3[\%]$, $Wgy\_m=101.7[\%]>Wgy\_c=51.3[\%]$, and therefore, $Wgy=Wgy\_c=51.3[\%]$. Also in the case where determination is performed by taking the maximum value of the virtual color material equivalent amounts $Vyi\_n$, $Vmi\_n$, and $Vci\_n$ of the ink of interest to be the criterion, $Vyi=15[\%]$, $Vmi=16[\%]$, and $Vci=17[\%]$. In this case, the ink amount Wgy that is caused to coincide with the virtual color material amount that is the source of conversion is selected so that the virtual color material equivalent amount $Vci$, which is the maximum value, becomes 34.9[%], and therefore, $Wgy=Wgy\_c=51.3[\%]$ also holds.

Next, the ink amount Wgy of the gray ink and the ink total amount limit Max_W are compared (S907) and further, the ink replacement processing is performed in accordance with the necessity (S908). After this, the determination of termination is performed (S909) and in the case where there is an unprocessed ink, the virtual color material amounts are updated (S910) and the processing by taking the next ink to be the ink of interest is repeated. Each change in the "virtual color material amounts that are the source of conversion", the "virtual color material amounts by the ink of interest", the "ink amount of each ink", and the "accumulated ink amount" in the loop processing at step 905 to step 910 described above is explained with reference to figures.

Figure 13:
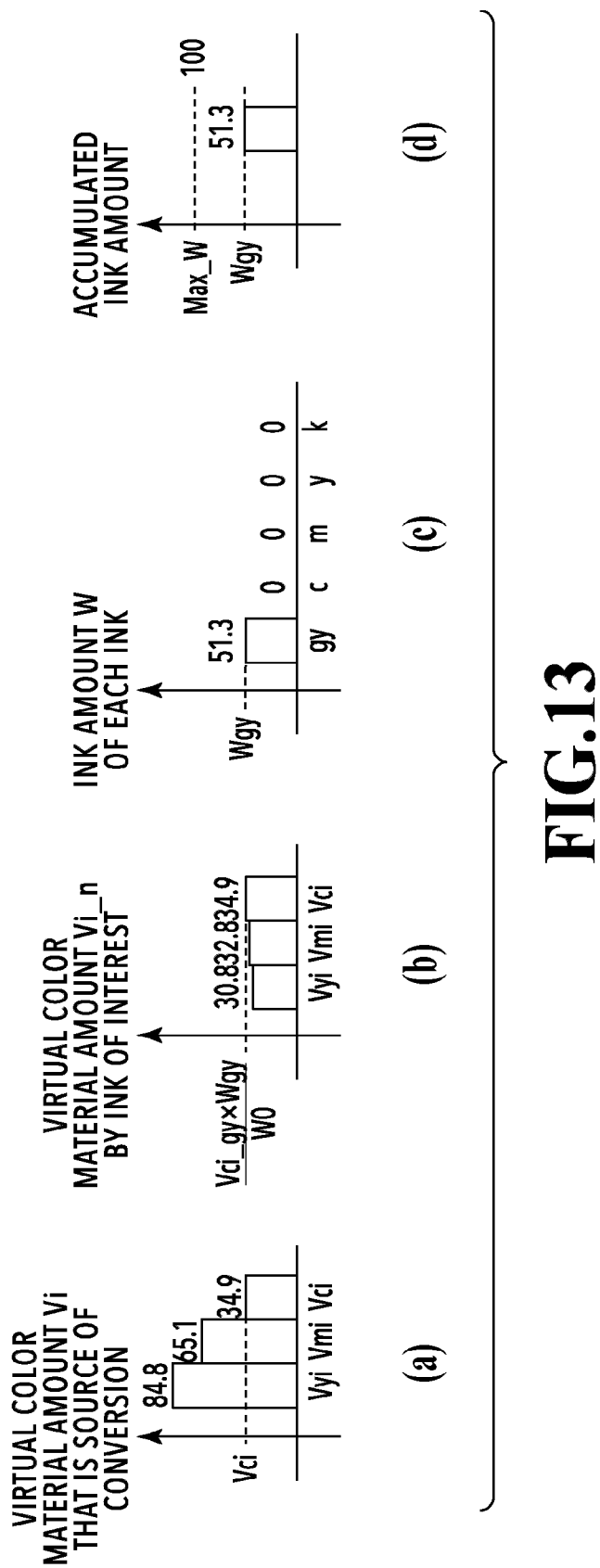
FIG. 13 is a diagram explaining a change in loop processing at S905 to S910.
Figure 14:
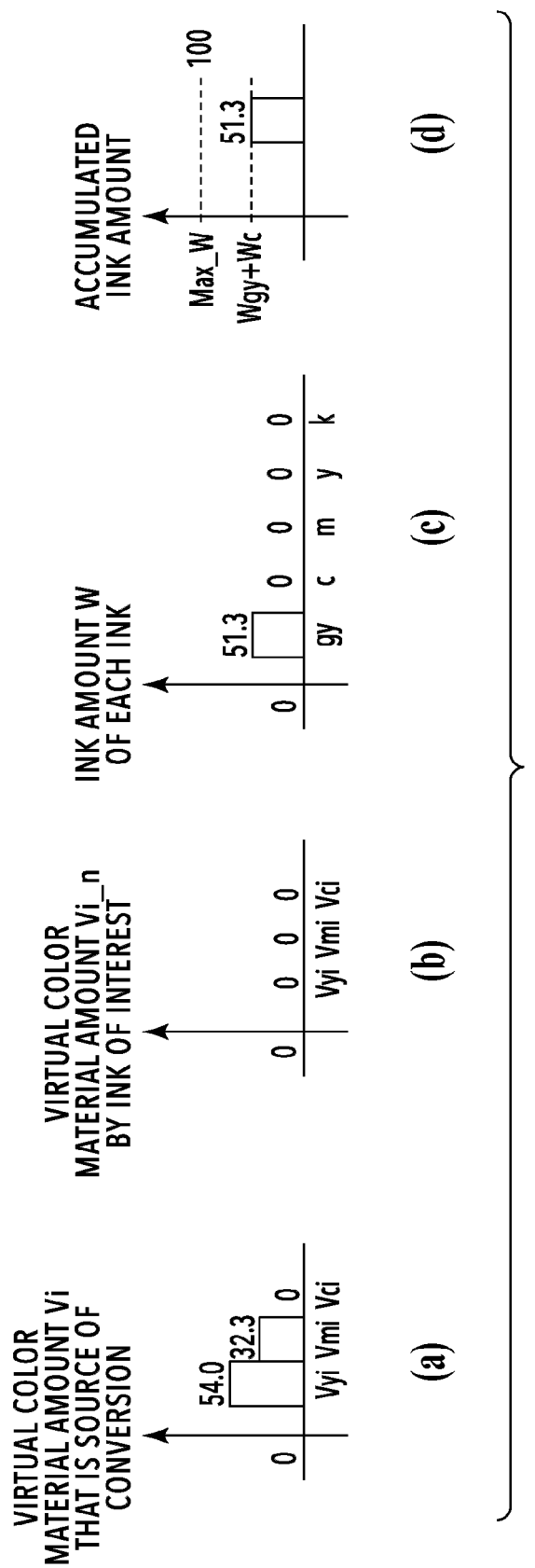
FIG. 14 is a diagram explaining a change in the loop processing at S905 to S910.

Each of FIG. 13(a) to FIG. 13(d) shows the "virtual color material amounts that are the source of conversion", the "virtual color material amounts by the ink of interest", the "ink amount of each ink", and the "accumulated ink amount" in the first loop. As described previously, in the first loop, as the ink of interest, the gray ink is selected (S905). The ink amount Wgy of the gray ink is $Wgy\_c=51.3[\%]$, which is the minimum value of $Wgy\_y$, $Wgy\_m$, and $Wgy\_c$. Consequently, as shown in FIG. 13(c), the ink amount Wgy of the gray ink=51.3[%] is determined (S906). In this stage, the ink amounts of the other inks are 0, and therefore, the accumulated ink amount=Wgy, and therefore, 51.3[%] (see FIG. 13(d)). Then, the accumulated ink amount≤the total amount limit Max_W (=100[%]) holds (Yes at S907), and therefore, the replacement processing is not performed in the first loop. Further, in the determination of termination, inks that have not been selected yet as the ink of interest exist (No at S909), and therefore, the virtual color material amounts that are the source of conversion are updated (S910). By this updating processing, Vyi=84.8[%], Vmi=65.1[%], and Vci=34.9[%] shown in FIG. 13(a) are updated to values obtained by subtracting the virtual color material amounts by the ink of interest (Vyi=30.8[%], Vmi=32.8[%], and Vci=34.9[%]) from those. FIG. 14(a) shows the virtual color material amounts that are the source of conversion after the updating and Vyi=54.0[%], Vmi=32.3[%], and Vci=0[%] are shown.

Each of FIG. 14(a) to FIG. 14(d) shows the "virtual color material amounts that are the source of conversion", the "virtual color material amounts by the ink of interest", the "ink amount of each ink", and the "accumulated ink amount" in the second loop. In the second loop, in accordance with the priority of conversion, the cyan ink is selected as the ink of interest (S905). Here, it is assumed that an ink amount Wc_c that satisfies the virtual color material amount Vci corresponding to a maximum value Vci_c of the virtual color material equivalent amounts of the cyan ink is taken to be the ink amount Wc of the cyan ink. Here, as shown in FIG. 14(a), the virtual color material amount that is the source of conversion Vci=0, and therefore, Wc=0 and all the virtual color material amounts by the ink of interest are also 0 (see FIG. 14(b)). Then, because Wc=0, the accumulated ink amount=Wgy+Wc remains unchanged, i.e., 51.3[%] (see FIG. 14(c)). Consequently, the accumulated ink amount≤the total amount limit Max_W (=100[%]) holds (Yes at S907), and therefore, the ink replacement processing is not performed also in the second loop. Then, inks (magenta, yellow, black) that have not been selected yet as the ink of interest exist (No at S909), and therefore, the virtual color material amounts that are the source of conversion are updated (S910). At this point in time, all the virtual color material amounts by the ink of interest are 0, and therefore, substantially the same state as that in FIG. 14(a) is maintained (see FIG. 15(a)).

Figure 15:
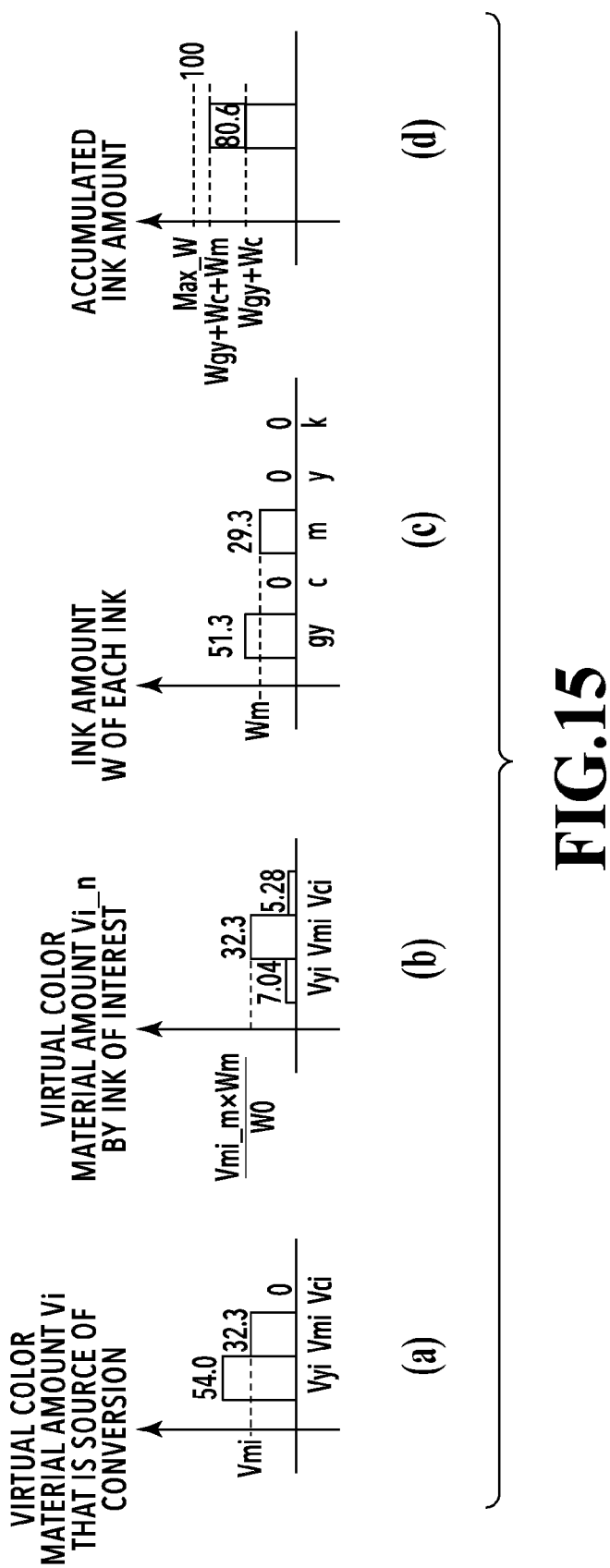
FIG. 15 is a diagram explaining a change in the loop processing at S905 to S910.

Each of FIG. 15(a) to FIG. 15(d) shows the "virtual color material amounts that are the source of conversion", the "virtual color material amounts by the ink of interest", the "ink amount of each ink", and the "accumulated ink amount" in the third loop. In the third loop, in accordance with the priority of conversion, the magenta ink is selected as the ink of interest. Here, as in the case of the cyan ink, an ink amount Wm_m that satisfies the virtual color material amount Vmi corresponding to a maximum value Vmi_m of the virtual color material equivalent amounts thereof is taken to be the ink amount Wm of the magenta ink. Here, the ink amount Wm=29.3[%] (see FIG. 15(c)). As a result of this, as shown in FIG. 15(d), the accumulated ink amount Wgy+Wc+Wm=80.6[%]. In this stage also, the accumulated ink amount the total amount limit Max_W (=100[%]) holds, and therefore, the replacement processing is not performed also in the third loop. Then, inks (yellow, black) that have not been selected yet as the ink of interest exist (No at S909), and therefore, the virtual color material amounts that are the source of conversion are updated (S910). By this updating processing, Vyi=54.0[%], Vmi=32.3[%], and Vci=0[%] shown in FIG. 15(a) are updated to values obtained by subtracting the virtual color material amounts by the ink of interest (Vyi=7.04[%], Vmi=32.3[%], Vci=5.28[%]) from those. Here, the virtual color material amount Vci' after the updating should naturally become a negative value, but it is set to 0 following the rule described previously. FIG. 16(a) shows the virtual color material amounts that are the source of conversion after the updating and Vyi=47.0[%], Vmi=0 [%], and Vci=0[%] are shown.

Figure 16:
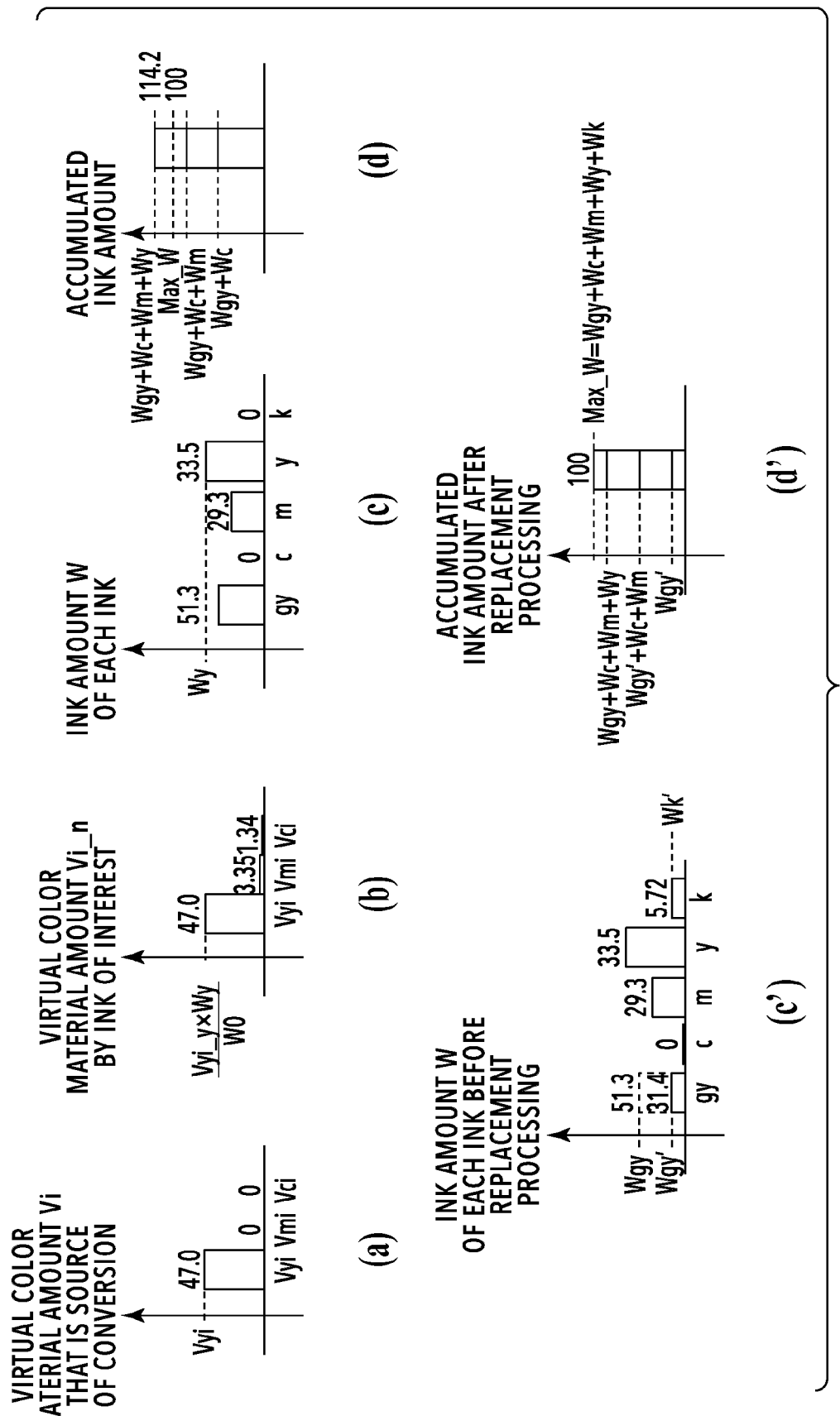
FIG. 16 is a diagram explaining a change in the loop processing at S905 to S910.

Each of FIG. 16(a) to FIG. 16(d) shows the "virtual color material amounts that are the source of conversion", the "virtual color material amounts by the ink of interest", the "ink amount of each ink", and the "accumulated ink amount" in the fourth loop. In the fourth loop, in accordance with the priority of conversion, the yellow ink is selected as the ink of interest. As in the case of the cyan ink and the magenta ink, an ink amount Wy_y that satisfies the virtual color material amount Vyi corresponding to a maximum value Vyi_y of the virtual color material equivalent amounts thereof is taken to be the ink amount Wy of the yellow ink. Here, the ink amount Wy=33.5[%] (see FIG. 16(c')). As a result of this, as shown in FIG. 16(d), the accumulated ink amount Wgy+Wc+Wm+Wy=114.2[%]. In this stage, the accumulated ink amount>the total amount limit Max_W (=100[%]) holds (No at step 907), and therefore, the ink replacement processing is performed (S908). That is, the processing to replace the gray ink whose priority is the highest with the black ink whose hue is the same and whose priority is low is performed by using expression (6-1) and expression (6-2) described previously. Here, the ratio of replacement γ=V_k/V_gy=(53+55.5+58.5)/(15+16+17)= 3.48. Consequently, the ink amount Wgy' of the gray ink after the replacement processing will be 51.3−(114.2−100)× 3.48/(3.48−1)=31.4[%]. Further, the ink amount Wk' of the black ink after the replacement processing will be 0+(114.2− 100)/(3.48−1)=5.72[%]. FIG. 16(c') and FIG. 16(d') show the ink amount of each ink and the accumulated ink amount after the replacement processing thus obtained, respectively. It is known that the accumulated ink amount is changed from the total sum Sum_W=114.2[%] to 100[%], which is the ink total amount limit. Then, in the termination determination processing that follows, an ink (black) that has not been selected yet as the ink of interest exists (No at S909), and therefore, the virtual color material amounts that are the source of conversion are updated (S910). By this updating processing, the virtual color material amounts that are the source of conversion in FIG. 16(a) are updated to values obtained by subtracting the virtual color material amounts of the ink of interest shown in FIG. 16(b) from those. At this time, Vmi' and Vci' should naturally become negative values, but both values are set to 0 following the rule described previously. As a result of this, the virtual color material amounts after the updating enter the state shown in FIG. 17(a) where Vyi=0[%], Vmi=0[%], and Vci=0[%].

Figure 17:
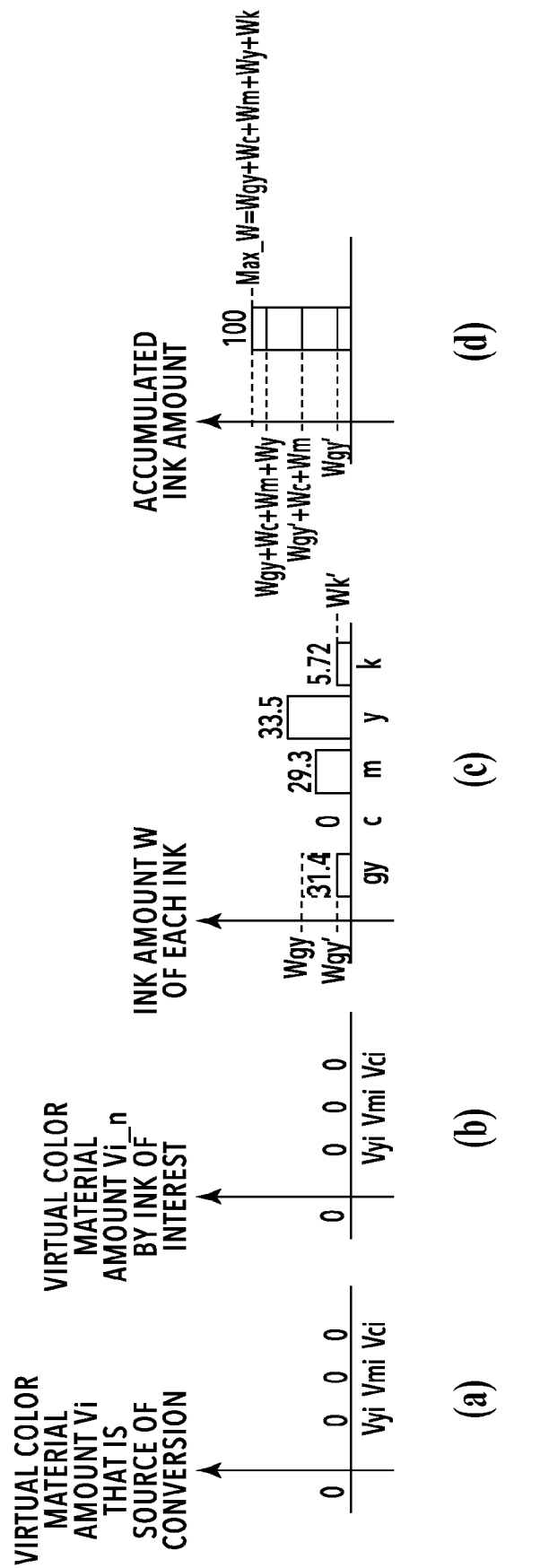
FIG. 17 is a diagram explaining a change in the loop processing at S905 to S910.

Each of FIG. 17(a) to FIG. 17(d) shows the "virtual color material amounts that are the source of conversion", the "virtual color material amounts by the ink of interest", the "ink amount of each ink", and the "accumulated ink amount" in the final loop. In the final loop, the black ink whose priority is the lowest is selected as the ink of interest. As the ink amount Wk of the black ink, as in the case of the gray ink, the minimum value of Wk_y, Wk_m, and Wk_c is used. However, as shown in FIG. 17(a), all the values of the virtual color material amounts that are the source of conversion at this point in time are 0, and therefore, Wk=0 results. Here, for the black ink, by the replacement processing in the fourth loop, the ink amount Wk=5.72[%] has already been given. Because of this, the value obtained by adding the value of Wk that is found in this loop to the value already given will be the value of the final ink amount Wk. In the present embodiment, the value of the ink amount Wk that is found in the final loop is 0, and therefore, the value given by the replacement processing in the fourth loop, i.e., 5.72[%], will be the value of the final ink amount Wk (see FIG. 17(c)). Consequently, the value of the accumulated ink amount is also the same value as that after the fourth loop, i.e., 100[%] (see FIG. 17(d)). Then, in the termination determination processing that follows, an ink that has not been selected yet as the ink of interest does not exist, and therefore, the processing to convert the virtual color material amount into the ink amount ends. It is known that Vyi=84.8 [%] of the initial virtual color material amounts Vyi, Vmi, and Vci coincides with the total value (30.8+0+7.04+47.0+ 0=84.8) of the determined virtual color material amounts of each ink at the point in time at which the output values of all the inks are determined.

Figure 18A:
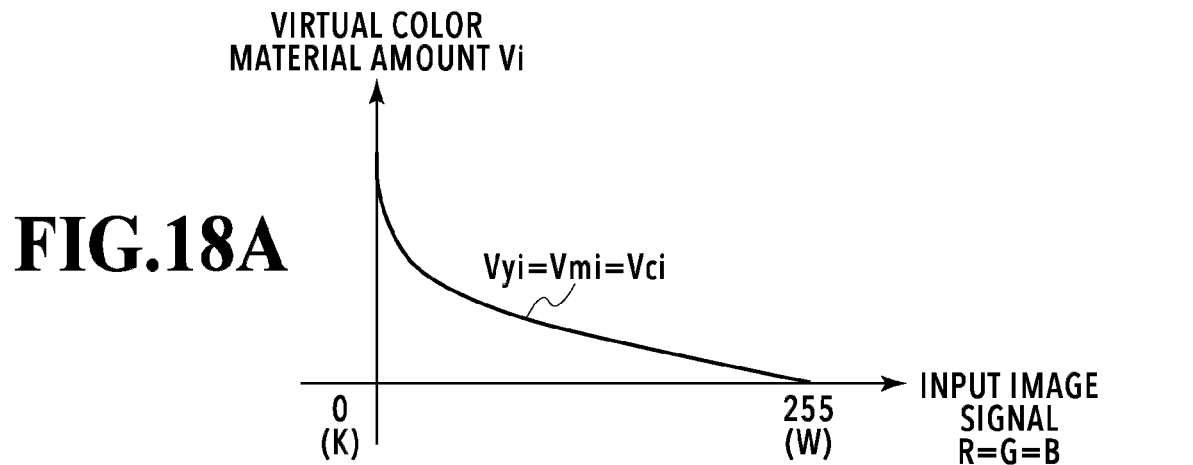
FIG. 18A is a diagram showing a separation example of an ink amount for an input image signal.
Figure 18B:
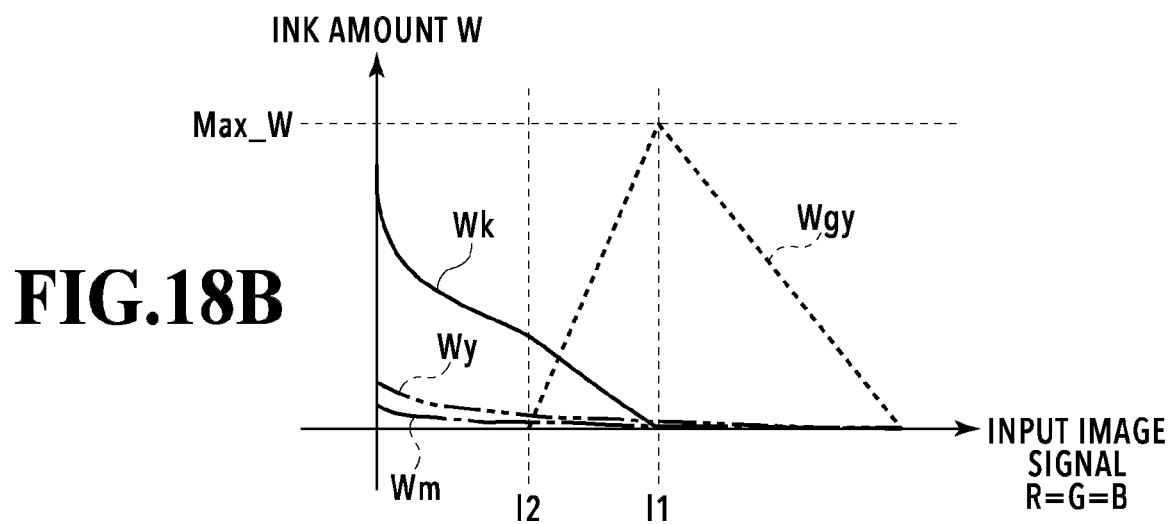
FIG. 18B is a diagram showing a separation example of an ink amount for an input image signal.
Figure 18C:
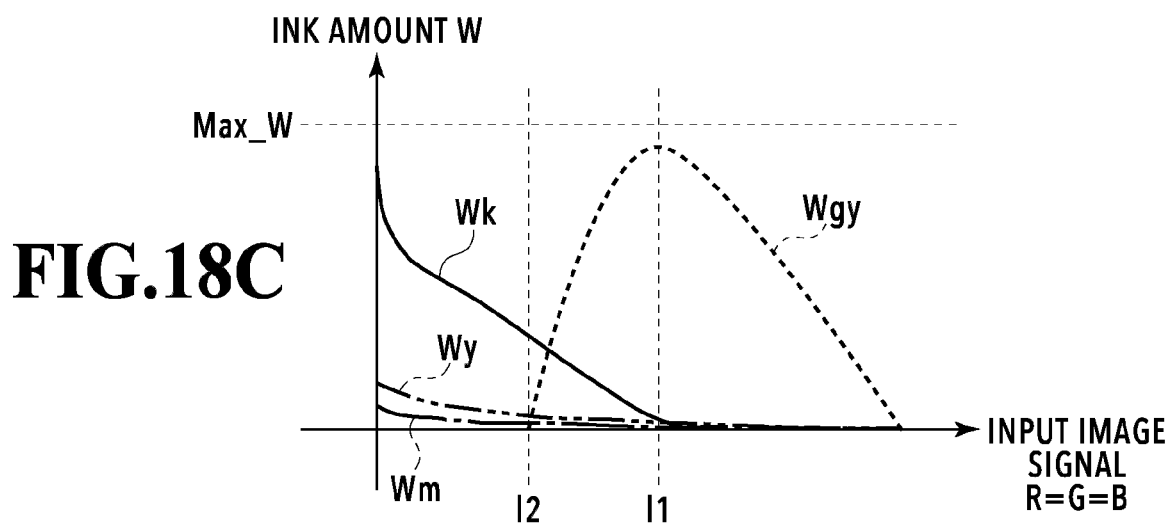
FIG. 18C is a diagram showing a separation example of an ink amount for an input image signal.

FIG. 18A to FIG. 18C each show a separation example of the ink amount for an input image signal in the present embodiment. FIG. 18A is a separation example of the virtual color material amount for an input image signal on the gray line (R=G=B=0 to 255) connecting W (R=G=B=255) and K (R=G=B=0) in the color cube shown in FIG. 2. FIG. 18B is a separation example of the ink amount for an input image signal.

In the case where the color conversion processing based on the concept as described above is performed by using the color conversion LUT 111, it is necessary to find the ink amount corresponding to the input RGB value in accordance with the flow in FIG. 3 described previously and to create a table. For example, in the case where the color conversion LUT 111 is an LUT having 17×17×17 grid points, the virtual color material amounts are derived from the block density corresponding to each grid point and after the virtual color material amounts are converted into the ink amount of each ink used in the printer, the input image signal (RGB value) and the ink amount are associated with each other. Alternatively, in the case of the color conversion LUT 111 having the ink amount corresponding to an 8-bit input RGB value in a one-to-one manner, the virtual color material amounts are derived from the block density corresponding to sixteen million colors (=256×256×256) and after the virtual color material amounts are converted into the ink amount, the RGB value and the ink amount are associated with each other.

Modification Example

There may be a configuration in which the color conversion LUT 111 is not used and each time an image signal is input, the color conversion in accordance flow in FIG. 3 described previously is performed in the color conversion processing unit 102. In this case, in place of the color conversion LUT 111, it is sufficient to hold only the information on the priority of conversion of inks used in the image forming apparatus 200. Then, each time an image signal is input, the color conversion processing unit 102 derives the virtual color material amounts from the input RGB value (S301) and converts the virtual color material amounts into the ink amount of each ink (S302).

Alternatively, it may also be possible to hold information on the virtual color material amounts corresponding to the input RGB value that are found in advance in the form of an LUT, in addition to the priority of ink conversion. In this case, it is sufficient for the color conversion processing unit 102 to, each time an image signal is input, skip the processing at step 301 and to perform only the processing to convert the virtual color material amounts into the ink amount of each ink.

In the present embodiment, explanation is given on the assumption that the priority of ink conversion and the priority in the ink replacement processing are the same, but they do not necessarily need to be the same. For example, for the ink whose priority of conversion is set high in order to prevent the bronze phenomenon and thin film interference, it may also be possible to reduce the priority in the ink replacement processing.

Further, in the present embodiment, in the updating processing (S910) of the virtual color material amounts that are the source of conversion, in the case where the virtual color material amount after the updating becomes a negative value, the virtual color material amount is set to 0. By replacing a negative value with 0 as described above, an error occurs and a difference arises between the input RGB value and the color that is formed actually. Consequently, in the processing (S906) to determine the ink amount of the ink of interest, for the ink whose priority is high, instead of determining the ink amount so that the main virtual color material of the ink of interest coincides with the virtual color material amount that is the source of conversion, it may also be possible to set an amount smaller than the ink amount in the case of coincidence. For example, the ink amount Wn of the ink of interest is set to an ink amount that does not exceed the virtual color material amount that is the source of conversion (e.g., an ink amount that satisfies 90% of the virtual color material that is the source of conversion). Then, the loop processing to determine an ink amount that does not exceed the virtual color material amount that is the source of conversion is performed until the number of virtual color material amounts and the number of inks that have not been selected yet as the ink of interest become equal. After this, the ink amount of inks that have not been selected yet are determined by using an equation relating to the ink amount and each virtual color material amount. By doing so, the virtual color material amounts that are acquired at first and the virtual color material amounts by all the inks used in the image forming apparatus 200 substantially coincide with each other and it is possible to suppress a difference between the input RGB value and the color that is formed actually. As described previously, in the present embodiment, it is premised that the color matching processing unit 101 is in charge of the processing to cause the input RGB value of an image signal to match with the color that is formed actually on a printing medium, and therefore, it is unlikely that the occurrence of an error as described above becomes a significant problem. By ignoring an error in the virtual color material amount that is not the main in the ink of interest, it is possible to suppress many inks whose priority is low from being included compared to the case where the total virtual color material amount of all the inks are caused to substantially coincide. Further, it is also possible to suppress the amount of calculation.

Figure 19:
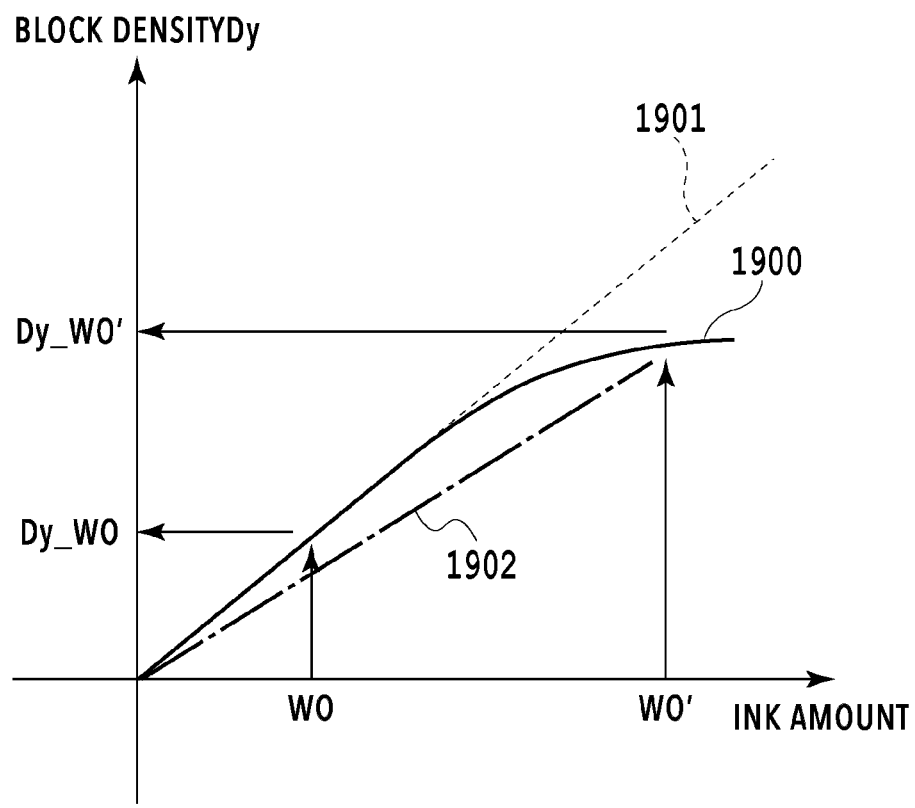
FIG. 19 is a diagram showing an example of a relationship between an ink amount and a block density Dy.

Further, in the present embodiment, the virtual color material amounts are converted into the ink amount by linear combination, and therefore, in the case where a relationship between two different ink amounts and the virtual color material amounts can be acquired for each ink, it is possible to perform conversion. For example, it is possible to perform the conversion processing by measuring two patches of paper white and in the predetermined ink amount W0[%] for each ink. However, for a common ink, it is known that Lambert's law does not hold in an area where the ink amount is very large. FIG. 19 is a graph representing an example of a relationship between the ink amount (horizontal axis) and the block density Dy (vertical axis). In this graph, a solid line 1900 indicates the actually measured values of the block density Dy. In the graph in FIG. 19, for the predetermined ink amount W0, it is desirable to use an area in which the relationship between the ink amount and the block density changes linearly. For example, in the case where ejection of 1,200×1,200 ink droplets in one square inch with an ejection amount of 4 µl is taken to be 100%, 25% is used as the predetermined ink amount W0. However, in the case where the virtual color material equivalent amounts derived on the assumption that the predetermined ink amount W0=25% are used to determine the ink amount of the ink of interest (S906), the ink amount is determined in accordance with characteristics indicated by a dot line 1901, and therefore, a supposed density is not obtained in the high-density portion. In this case, in order to obtain a supposed maximum density by a desired ink amount, it is sufficient to use an ink amount W0' that implements a maximum density Dy_W0' as the predetermined ink amount. However, by simply using the predetermined ink amount W0' such as this, the ink amount is determined on the assumption that the ink amount and the maximum density change with characteristics indicated by a one-dot chain line 1902, and therefore, the halftone area becomes dark this time. There is a way of thinking that it is sufficient to correct the halftone area that has become dark by color matching as described previously. However, in the case where the color conversion LUT 111 has thinned grid point values and a value of an area other than the grid point is found by linear interpolation, it is desirable to be linear with the density from the viewpoint of an interpolation error. Consequently, the conversion from the virtual color material equivalent amounts into the ink amount is performed without using expressions (5-1) to (5-3) based on Lambert's law described previously. For example, it may also be possible to determine the ink amount from the virtual color material equivalent amounts by using a one-dimensional table in which the ink amount becomes larger in the high-density portion, a nonlinear function, and so on.

Further, in the present embodiment, as the virtual color material amount and the ink amount, the applied material amount [%] is used as the value for which Lambert's law holds. However, the virtual color material amount and the ink amount are not limited to the applied material amount [%] and any value is acceptable as long as Lambert's law holds for the value. For example, it may also be possible to use the pixel value of the ink value image that is used for halftone processing. Alternatively, it may also be possible to convert the virtual color material amount and the ink amount into values for which Lambert's law holds, such as the coverage factor and the film thickness, at the time of color conversion processing, by using the weight (picogram) and the volume (picoliter). In this case, the virtual color material amount is converted into the ink amount by linear combination. Because of this, in the case where the virtual color material amount changes smoothly, the ink amount after the conversion also changes smoothly, and therefor, it is possible to obtain a color conversion LUT with favorable gradation properties.

The virtual color materials yi, mi, and ci in the method of the present embodiment do not depend on a printer or a set of color materials to be used. For example, even in the case where a red ink is added to the ink set of the five color inks described previously, on a condition that the priority of conversion of the colors including red is determined, it is possible to convert the ink set into an ink set including the red ink. At this time, from the ink characteristics of the red ink (see FIG. 11(f)), the main virtual color materials of the red ink are determined to be yi and mi and the minimum value of Wn_y and Wn_m is taken to be an ink amount Wr of the red ink as the ink of interest. By doing so, it is possible to determine the ink amount Wr by taking into consideration the ink characteristics of the red ink. As described above, even in the case of a different ink set, it is possible to deal with the case only by changing the priority to be referred to.

Further, it may also be possible to make the priority of ink conversion differ in accordance with the position in the color conversion LUT 111. For example, on the line that connects the primary point of cyan and the primary point of black, it may also be possible to give priority to the cyan and black inks or to perform conversion into only the cyan and black inks. Further, it may also be possible to give higher priority to the ink whose correlation with the ratio of the target virtual color material is higher.

In the case where a clear color material (clear ink and the like) is included in the actual color materials, it is not necessary to take into consideration the clear color material in particular (the clear color material does not have any relationship with the priority of conversion) from the viewpoint of the color conversion of an input image signal, but it is necessary to take into consideration the clear color material from the viewpoint of the ink total amount limit. That is, in the determination processing at step 907, it is necessary to subtract the output value of the clear ink from the ink total amount limit Max_W. Specifically, from the total amount limit Max_W, a predetermined clear ink amount cl is subtracted, and a value (Max_W–cl) after the subtraction and the total sum of the ink amounts Sum_W are compared, and whether the total sum Sum_W is less than or equal to the total amount limit after the subtraction is determined. It may also be possible to determine the predetermined clear ink amount from the glossiness data that is input along with the input image data or to determine in advance the clear ink amount to be used for each page.

Figure 20:
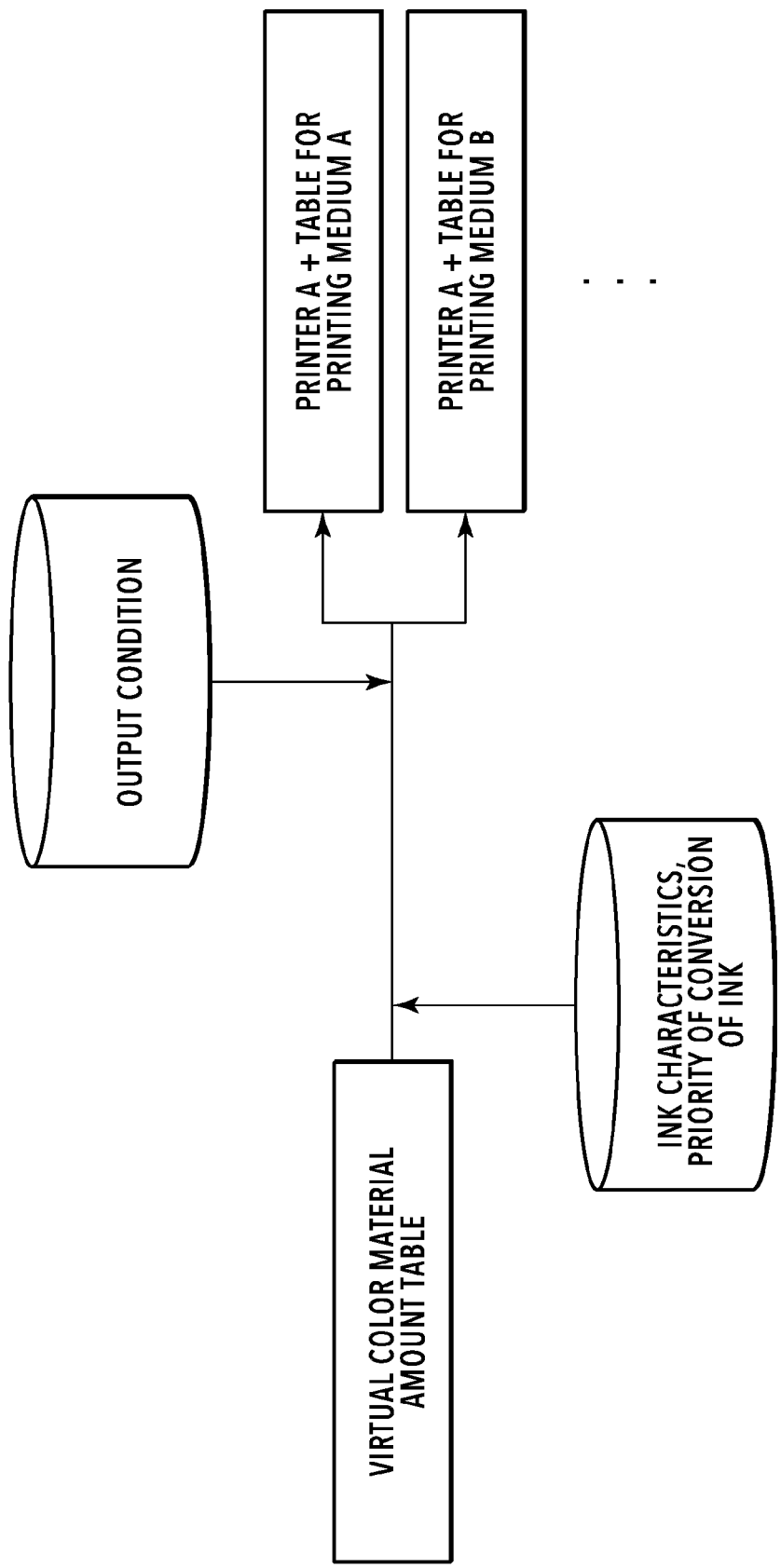
FIG. 20 is a diagram showing an example of a configuration for obtaining a color conversion LUT in accordance with an output condition.

Further, it may also be possible to create a color conversion LUT corresponding to different output conditions from the same virtual color material amount table by changing the value of the ink total amount limit in accordance with the output conditions, such as the type of printing medium (plain sheet, coated sheet, and so on), the printing speed, the number of passes in the multipass printing scheme. Here, the virtual color material amount table is a table in which the input image signal and the virtual color material amount are associated with each other. For example, a database storing information on the characteristics of each ink used in the printer and the priority of ink conversion is prepared, and further, a database storing the above-described output conditions is prepared, and thereby, a color conversion LUT in accordance with actual output conditions is created each time (see FIG. 20). By designing such a configuration, it is possible to obtain a color conversion LUT in accordance with the necessity, which corresponds to each printing mode, such as the printing mode in which priority is given to granularity and the printing mode in which priority is given to ink consumption, for each image forming apparatus while maintaining smoothness of gradation.

According to the present embodiment, it is possible to easily implement color conversion processing in which discontinuity in output gradation is reduced and smooth gradation properties are guaranteed.

Second Embodiment

The first embodiment is the aspect in which the ink amount W that guarantees smoothness of a virtual color material amount Vi is derived by converting the virtual color material amounts into the ink amount as the actual color material amount. However, by the method of the first embodiment, the smoothness of the ink amount W after conversion for the input image signal is not guaranteed. For example, in the color separation example shown in FIG. 18B described previously, the ink amount Wgy of the gray ink is discontinuous at the position of an input image signal value I1. Here, I1 is the minimum input image signal value that causes the ink replacement processing to occur because the accumulated ink amount (total sum Sum_W)>the ink total amount limit Max_W holds (No at S907) in the conversion processing from the virtual color material amounts into the ink amount (flow in FIG. 9). Further, at the position of an input image signal value I2 also, the ink amount Wk of the black ink is discontinuous. Here, I2 is the minimum input image signal value by which the entire ink amount Wgy of the gray ink is replaced with the ink amount Wk of the black ink in the conversion processing from the virtual color material amounts into the ink amount.

Even in the case where the ink amount W is discontinuous as described above, on a condition that the virtual color material amount Vi changes smoothly, a deterioration of gradation does not occur. However, in the case where the hues of both the gray ink and the black ink are largely different even though the ratio between the virtual color material equivalent amounts is regarded as substantially the same and the replacement is performed by using the ratio of replacement γ, there is a possibility that discontinuity of gradation due to the hue difference occurs at the input image signal values I1 and I2.

Consequently, an aspect is explained as a second embodiment in which the gradation properties are further improved by performing smoothing processing for the actual color material amount after conversion to make the change in the actual color material amount also smooth. Explanation of the portions in common to those of the first embodiment is omitted or simplified and in the following, different points are explained mainly.

Figure 21:
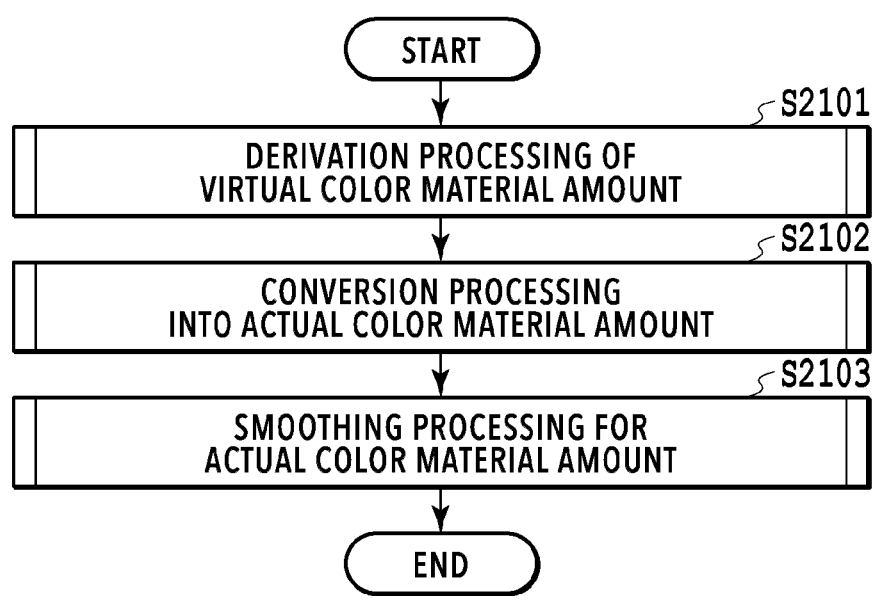
FIG. 21 a flowchart showing a flow of color conversion processing according to a second embodiment.

FIG. 21 is a flowchart showing a flow of color conversion processing according to the present embodiment. Step 2101 and step 2102 correspond to step 301 and step 302, respectively, in the flow in FIG. 3 of the first embodiment. That is, output values of virtual color materials (virtual color material amounts) whose number is smaller than the number of inks used in the image forming apparatus 200 are found (S2101) and the found virtual color material amounts are converted into the ink amount as the actual color material amount based on a substantially linear conversion expression or conversion table (S2102).

Figure 22:
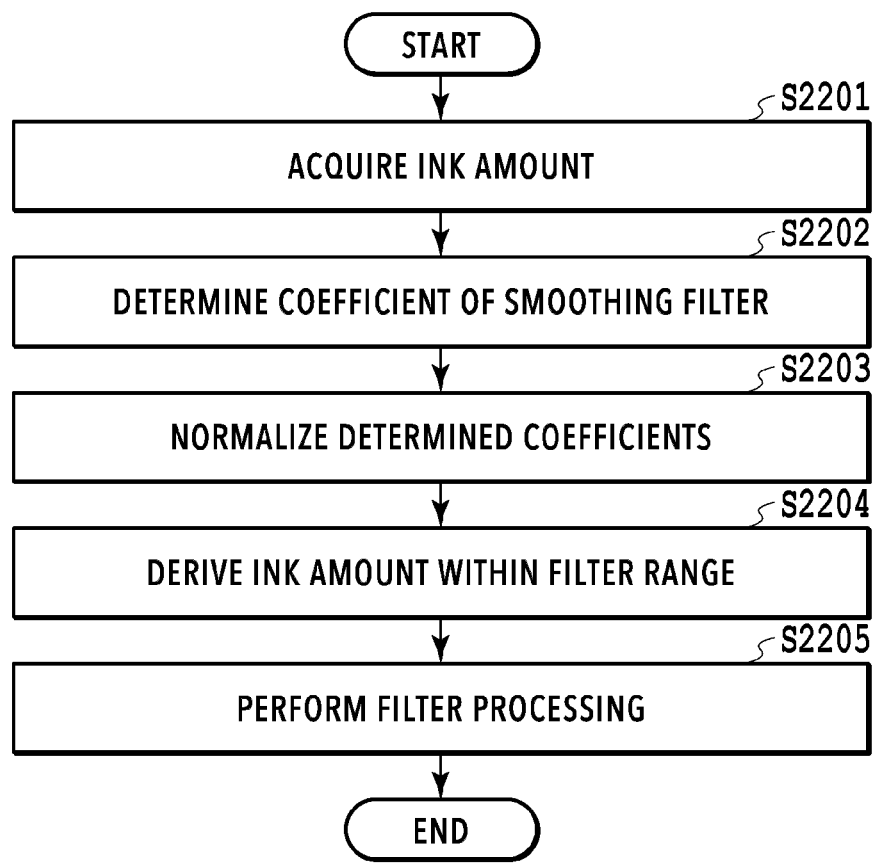
FIG. 22 is a flowchart showing details of smoothing processing.

At step 2103 that follows, for the ink amount W derived at step 2102, smoothing processing is performed. Due to this, smoothness of the ink amount W for the input image signal is guaranteed. It is assumed that the smoothing processing of the present embodiment is performed on the RGB color space of the input image signal. FIG. 22 is a flowchart showing details of the smoothing processing. In the following, explanation is given on the assumption that the color conversion processing unit 102 finds the ink amount W for which the smoothing processing has been performed in accordance with the flow shown in FIG. 22 each time the input image signal (RGB value) is input.

At step 2201, the ink amount W as the actual color material amount derived at step 2102 described above is acquired. For example, in the case where the kinds of ink used in the image forming apparatus 200 is cyan, magenta, yellow, gray, and black, the ink amounts Wc, Wm, Wy, Wk, and Wgy corresponding to those five colors for the input RGB value are acquired, respectively.

At step 2202, the coefficient of a filter used in the smoothing processing is determined. In the present embodiment, a three-dimensional Gaussian filter F whose filter size is (2×r0+1)×(2×r0+1)×(2×r0+1) is used. Here, r0 is a parameter relating to the filter size and is given by a designer or the like. It is possible to define the three-dimensional Gaussian filter F by, for example, expression (8) below.

$$F(\Delta R, \Delta G, \Delta B) = \exp(-(\Delta R^2 + \Delta G^2 + \Delta B^2)/2s^2) \quad \text{expression (8)}$$

For the filter defined by expression (8) described above, the coefficient is determined in accordance with a distance (ΔR, ΔG, ΔB) on each axis from an input image signal for which the smoothing processing is performed. That is, ΔR is the distance on the R-axis from an input image signal (R, G, B) for which the smoothing processing is performed and r0≥ΔR≥-r0 holds. Similarly, ΔG is the distance on the G-axis from the input image signal (R, G, B) and r0≥ΔG≥-r0 holds, and ΔB is the distance on the B-axis from the input image signal (R, G, B) and r0≥ΔB≥-r0 holds. Further, s is value relating to variance and the larger s, the more strongly the smoothing processing is performed. It may also be possible for a designer to give s or s may be calculated from the filter size r0. The larger s, the more strongly the smoothing processing is performed, and therefore, the larger s, the more strongly a step of gradation due to the hue difference in ink is suppressed. However, the larger s, the more likely the amount of ink whose priority is low is used, and therefore, granularity deteriorates. Alternatively, the ink amount increases. Consequently, it may also be possible to determine s based on the hue difference between inks regarded as having the same hue.

At step 2203, the total of the determined coefficients of the three-dimensional Gaussian filter F is normalize to 1. Specifically, a filter F' (ΔR, ΔG, ΔB) obtained by normalizing the filter F (ΔR, ΔG, ΔB) by expression (9) below is found.

$$F'(\Delta R, \Delta G, \Delta B) = F(\Delta R, \Delta G, \Delta B) \times ((2 \times r0+1)^3/\text{sum}\_F) \quad \text{expression (9)}$$

In expression (9) described above, sum_F is the sum of coefficients in a range of r0≥ΔR>-r0, r0≥ΔG≥-r0, and r0≥ΔB≥-r0 of the three-dimensional Gaussian filter F.

At step 2204, the ink amount necessary for the smoothing processing is derived. Specifically, the ink amount corresponding to an input image signal (R+ΔR, G+ΔG, B+ΔB) within the filter range (r0≥ΔR≥-r0, r0≥ΔG≥-r0, r0≥ΔB≥-r0) is determined as the ink amount necessary for the smoothing processing. For example, in the case where r0=1 and the RGB values of the input image signal are (128, 128, 128), for the combinations of the RGB values shown in a table below, each piece of processing of conversion from the RGB values into the virtual color material amounts and conversion from the virtual color material amounts into the ink amount is performed.

TABLE 3

| R | G | B |
|---|---|---|
| 127 | 127 | 127 |
| 127 | 127 | 128 |
| 127 | 128 | 127 |
| 127 | 128 | 128 |
| 128 | 127 | 127 |
| 128 | 127 | 128 |
| 128 | 128 | 127 |
| 128 | 128 | 128 |
| 128 | 128 | 129 |
| 128 | 129 | 128 |
| 128 | 129 | 129 |

TABLE 3-continued

| R | G | B |
|---|---|---|
| 129 | 128 | 128 |
| 129 | 128 | 129 |

At step 2205, the filter processing using the normalized three-dimensional Gaussian filter F' is performed. Specifically, based on expression (10) below, an ink amount W' (R, G, B) after filtering for the input image signal (R, G, B) is found.

(Mathematical expression 1)

$$W' = \sum_{\Delta R\infty = r0}^{r0} \sum_{\Delta G\infty = r0}^{r0} \sum_{\Delta B\infty = r0}^{r0} W(R + \Delta R, G + \Delta G, B + \Delta B) \times F'(\Delta R, \Delta G, \Delta B) \quad \text{expression (10)}$$

In expression (10) described above, W (R, G, B) indicates the actual ink amount before the smoothing processing for the input image signal (R, G, B).

The above is the contents of the color conversion procession including the smoothing processing according to the present embodiment. Due to this, it is possible to obtain the actual color material amount (here, ink amount) that changes smoothly for the input image signal. FIG. 18C is a diagram corresponding to FIG. 18B described previously and is a separation example in the case where the smoothing processing is performed for the determined ink amount. It is known that the ink amount for the input image signal changes smoothly compared to FIG. 18B. In this manner, it is possible to suppress the step of gradation due to the hue difference between inks.

Modification Example

In the case where the above-described three-dimensional Gaussian filters F and F' are used, the ink amount at the outermost shell (external surface of the cube shown in FIG. 2) of the color conversion LUT changes before and after the smoothing processing. The ink amount corresponding to the primary point of the color conversion LUT relates to the color area the printer can represent, and therefore, it is favorable for the ink amount for the input image signal located at the outermost shell not to change before and after the smoothing processing. Consequently, it may also be possible to change the filter size in accordance with the input image signal. In the following, detailed explanation is given.

In the present modification example, in place of using the filter isotropic for each axis of RGB, an anisotropic filter whose size is set independently for each of the R-axis, G-axis, and B-axis in accordance with an input image signal is used. First, minimum values dR, dG, and dB of distances between the input image signal (R, G, B) and the outer shells of RGB are found. The "outer shells of RGB" refer to the maximum value or the minimum value of each of RGB and in the case where the RGB value is represented by eight bits, 0 or 255. For example, in the case where the input image signal is R=240, G=128, and B=10, dR=255−240=15, dG=255−128=127, and dB=10−0=10. Next, the minimum values dR, dG, and dB of the distances from the outer shells of RGB and the filter size of the Gaussian filter are compared and the filter size is set independently for each of the R-axis, G-axis, and B-axis. Specifically, in the case where the filter sizes for the R-axis, G-axis, and B-axis are taken to be rR, rG, and rB, respectively, on a condition that dR>r0, rR=r0 is set and on a condition that dG=r0 or dG<r0, rR=dR is set. Similarly, in the case where dG>r0, rG=r0 is set and in the case where the dG=r0 or dG<r0, rG=dG is set. Further, in the case where dB>r0, rB=r0 is set and in the case where dB=r0 or dB<r0, rB=dB is set. For example, in the case where r0=64, dR=15, dG=127, and dB=10, rR=15, dG=64, and dB=10 are obtained.

By determining the filter size as described above, at the primary point, the filter size is 0, and therefore, it is possible to generate a filter that does not change the ink amount at the primary point due to the smoothing processing. Then, the coefficient of the smoothing filter is generated by expression (8) described previously. However, it is assumed that rR≥ΔR≥−rR, rG≥ΔG≥−rG; and rB≥ΔB≥−rB. By using the filter and the filter size acquired as described above, it is possible to implement smoothing processing that does not change the ink amount at the primary point.

Further, in the present embodiment, explanation is given on the assumption that each time the input image signal (RGB value) is input, the color conversion processing unit 102 performs the smoothing processing in accordance with the flow shown in FIG. 22. However, it is not necessarily required for the color conversion processing unit 102 to perform the smoothing processing. For example, it may also be possible to implement smoothing processing by performing convolution processing for a smoothing filter for each grid point on the color conversion LUT that associates the input image signal and the ink amount with each other.

The method of smoothing is not limited to the filter processing by a Gaussian filter. For example, it may also be possible to use a cosine roll-off filter or a moving average. Alternatively, it may also be possible to perform smoothing by approximating to a polynomial, such as a spline curve or a Bezier curve.

Further, it may also be possible to perform smoothing of the ink amount on the color space of the virtual color material amount in place of performing smoothing of the ink amount on the RGB color space of the input image signal.

According to the present embodiment, by further performing smoothing processing for the actual color material amount found by the method of the first embodiment, it is possible to make smooth the change in the actual color material amount also and to further improve gradation properties.

Third Embodiment

In the virtual color material amount derivation processing in the first embodiment, it is assumed that the input image signal is sRGB and from all the RGB values, the virtual color material amounts are determined by an arithmetic operation and smooth gradation properties are implemented. However, in the case where the virtual color material amounts are found by an arithmetic operation from all the RGB values of the input image signal, there is a case where trouble such as below occurs.

In the case where each axis of RGB is raised to the y-th power (to the power of about 0.45) for the linear RGB, for example, such as sRGB, it is possible to find the virtual color material amounts from all the RGB values. However, in the case where different γ values are set to each axis of RGB (for example, R is raised to the power of 0.3, G to the power of 0.6, and B to the power of 0.5), it is easy to find the virtual color material amount on each axis of RGB, but it is not easy to find the virtual color material amount from the RGB value not on the axis. Further, for favorable contrast reproduction, there is a case of raising to the power of an S-shaped gamma, or a case where the S-shaped gamma is different in a high-saturation area. That is, with the method of the first embodiment, in the case where each axis of RGB is raised to the power of a different γ or raised to the power of a different S-shaped gamma in a high-saturation area, it is difficult to find the virtual color material amount corresponding to an RGB value other than those on each axis of RGB.

Consequently, an aspect is explained as a third embodiment in which the virtual color material amount for the input RGB value is obtained by finding the virtual color material amount on each axis of RGB (at a predetermined point in the color cube in FIG. 2) first, and then by performing interpolation processing using the found virtual color material amounts to find the virtual color material amount between the axes. Explanation of the portions in common to those of the first embodiment is omitted or simplified and in the following, different points are explained mainly.

Figure 23:
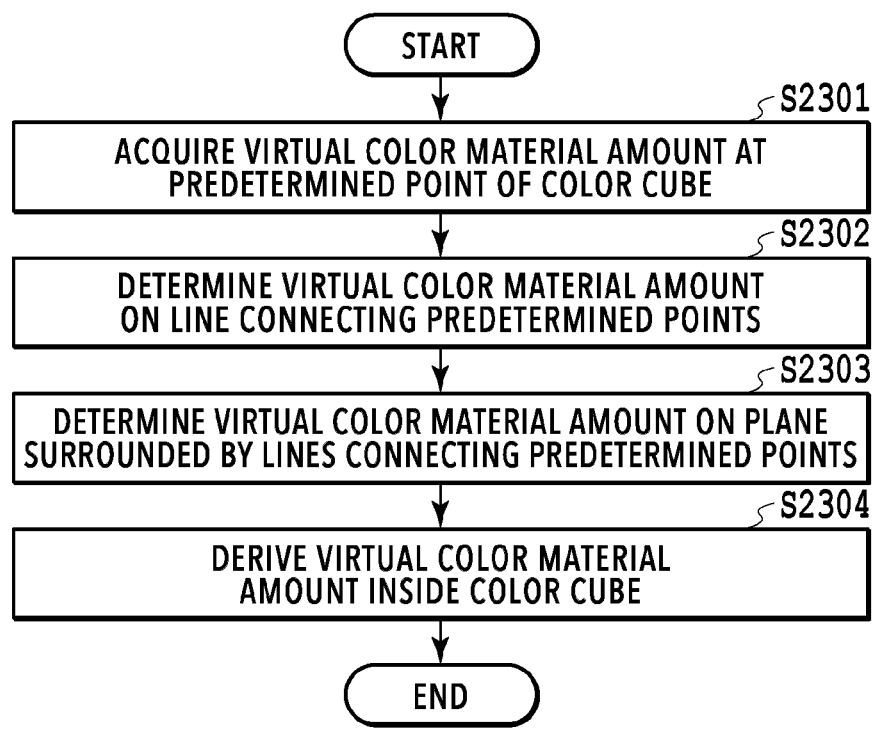
FIG. 23 is a flowchart showing details of virtual color material amount derivation processing according to a third embodiment.

FIG. 23 is a flowchart showing details of the virtual color material amount derivation processing according to the present embodiment. First, at step 2301, each virtual color material amount corresponding to a predetermined point in the color cube is acquired. At this time, it is desirable for the predetermined points to include the primary point described previously. The virtual color material amount corresponding to a predetermined point is obtained by a designer determining a spectral reflectance R (λ) for each primary color, finding a block density from the determined R (λ), and performing conversion from the found block density into the virtual color material amount. In the case where the predetermined points are the primary points of cyan, magenta, yellow, and black, it is sufficient to set the virtual color material amount in the ink total amount limit Max_W[%] of the ink corresponding to each color. For example, in the case where the virtual color material equivalent amount in a predetermined ink amount W0[%] of the yellow ink is Vyi_y, it is sufficient to set the virtual color material amount found by Vyi_y×Max_W/W0 as the virtual color material amount at the yellow primary point. Further, in the case where the predetermined point is the red primary point, it is sufficient to set the virtual color material amount in the case where the yellow and magenta inks are applied up to the ink total amount limit Max_W [%] with a predetermined ratio as the virtual color material amount at the red primary point. The predetermined ratio at this time is determined by a designer. In the case where the printer includes the red ink, it may also be possible to set the virtual color material amount in the case where the red ink is applied up to the ink amount limit as the virtual color material amount at the red primary point. Further, in the case where the predetermined point is the green primary point, as in the case of red, it is sufficient to set the virtual color material amount in the case where the cyan and yellow inks are applied up to the ink total amount limit Max_W with a predetermined ratio as the virtual color material amount at the green primary point. Furthermore, in the case where the predetermined point is the blue primary point also, it is sufficient to set the virtual color material amount in the case where the cyan and magenta inks are applied up to the ink total amount limit Max_W with a predetermined ratio as the virtual color material amount at the blue primary point. Alternatively, it may also be possible for a designer to determine the ink amount at the primary point and to give the virtual color material amount inversely calculated from the ink amount as the virtual color material amount at the primary point.

At step 2302, the virtual color material amount on the line connecting the above-described predetermined points is determined. At this time, the virtual color material amount is determined so that the change in the virtual color material amount is smooth. For example, a function that passes from a predetermined point to another predetermined point, which monotonically increases, and which has no inflection point (whose secondary differential does not become negative) is defined and the virtual color material amount on the line connecting predetermined points is determined. Alternatively, it may also be possible to determine the color material amount so as to monotonically increase and cause no inflection point to occur by a publicly known interpolation operation, such as linear interpolation. As an example, a case is explained where the virtual color material amount between the white primary point and the cyan primary point, as the predetermined points, is determined by linear interpolation. Here, it is assumed that the virtual color material amounts at the white primary point are W_Vyi, W_Vmi, and W_Vci, respectively. Similarly, it is assumed that the virtual color material amounts at the cyan primary point are C_Vyi, C_Vmi, and C_Vci, respectively. At this time, virtual color material amounts P_Vyi, P_Vmi, and P_Vci at an arbitrary point P located between both the primary points are found by expression (11-1) to expression (11-3) below, respectively.

$$P\_Vyi = W\_Vyi + (C\_Vyi - W\_Vyi) \times x/L \quad \text{expression (11-1)}$$

$$P\_Vmi = W\_Vmi + (C\_Vmi - W\_Vmi) \times x/L \quad \text{expression (11-2)}$$

$$P\_Vci = W\_Vci + (C\_Vci - W\_Vci) \times x/L \quad \text{expression (11-3)}$$

In expression (11-1) to expression (11-3) described above, L indicates the distance between the white primary point and the cyan primary point on the RGB color space. Further, x indicates the distance from the white primary point to the point P on the RGB color space.

Figure 24A:
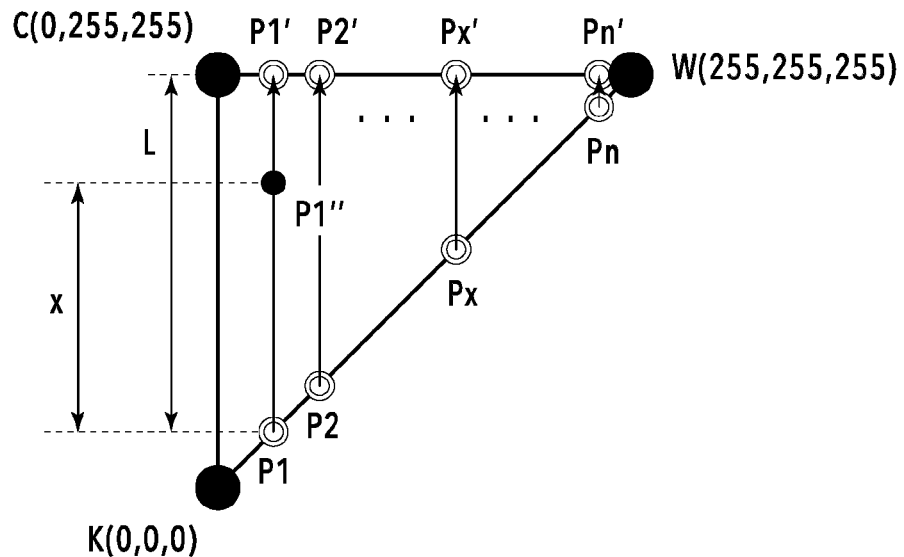
FIG. 24A is a diagram showing the way a virtual color material amount on a plane is determined.

At step 2303, the virtual color material amount on the plane surrounded by the lines connecting predetermined points at the time of determining the virtual color material amount at step 2302 is determined. For example, the virtual color material amount on the plane made up of a W-K line connecting the white primary point and the black primary point and one of the other vertexes (R, B, C, M, Y) is determined by the same method as that at step 2302 described above. In this case, the virtual color material amounts on the six planes including the W-K line are determined. FIG. 24A is a diagram showing the way the virtual color material amount on a W-K-C plane is determined. First, the virtual color material amounts at a point Px on the W-K line and at an intersection Px' of a perpendicular dropped from the point Px and a C-W line are acquired. Then, from the acquired virtual color material amounts, the virtual color material amount on the line connecting the point Px and the point Px' is determined by a higher-order function or publicly known interpolation processing, such as linear interpolation. For example, in the case where an amount of the virtual color material yi P1"_Vyi at a point P1" on the line connecting a point P1 and a point P1' is found by linear interpolation, it may be possible to use expression (11') below.

$$P1"\_Vyi = P1\_Vyi + (P1'\_Vyi - P1\_Vyi) \times x/L \quad \text{expression (11')}$$

In expression (11') described above, P1_Vyi is the amount of the virtual color material yi at the point P1 and P1'_Vyi is the amount of the virtual color material yi at the point P'1. Further, L is the distance between the point P1 and the point P1' on the RGB color space and x is the distance between the point P1 and the point P1" on the RGB color space.

At step 2304, the virtual color material amount inside the color cube is derived. In the present embodiment, the color cube is divided into tetrahedrons and the virtual color material amount inside the tetrahedron is derived for each tetrahedron. FIG. 25A to FIG. 25F are diagrams explaining the way the color cube is divided into six tetrahedrons including the above-described K-W line and the virtual color material amount inside the tetrahedron is derived independently for each tetrahedron. The virtual color material amounts on the two planes including the W-K line of the four planes making up each tetrahedron are already derived at step 2030. In the present embodiment, the planes the virtual color material amounts on which are already derived are connected by a line parallel to one of the RGB axes. Then, for each connected line, the virtual color material amount is found by a higher-order function or publicly known interpolation processing, such as linear interpolation, and thus the virtual color material amount inside the tetrahedron is derived. Here, specific explanation is given by taking the case of FIG. 25A as an example. In a tetrahedron (tetrahedron W-C-K-B surrounded by plane W-C-K, plane W-B-K, plane W-C-B, plane C-B-K) shown in FIG. 25A, the virtual color material amounts on the two planes (plane W-C-K and plane W-B-K) including W and K are already derived. At this time, in order to find a virtual color material amount Q"_Vi at a point Q" inside the tetrahedron W-C-K-B, first, a virtual color material amount Q1_Vi at an intersection Q1 of a line passing the point Q1" and parallel to the G-axis, and the plane W-C-K is acquired. Similarly, a virtual color material amount Q1'_Vi at an intersection Q1' of the line passing the point Q1" and parallel to the G-axis, and the plane W-B-K is acquired. Then, from the acquired two virtual color material amounts Q1_Vi and Q1'_Vi, the virtual color material amount Q1"_Vi at the point Q1" is found by a higher-order function, interpolation processing, and so on. For example, in the case where Q1"_Vi is found by linear interpolation, it may be possible to use expression (11") below.

$$Q1\text{"}\_Vi = Q1\_Vi + (Q1'\_Vi - Q1\_Vi) \times x/L \qquad \text{expression (11")}$$

In expression (11") described above, L is the distance between the point Q1 and the point Q1' on the RGB color space and x is the distance between the points Q1 and Q1" on the RGB color space.

The above is the contents of the virtual color material amount derivation processing according to the present embodiment. Due to this, it is possible to derive the virtual color material amount at any point inside the color tube.

In the case where each time an image signal is input, the color conversion processing unit 102 derives the virtual color material amounts and converts the virtual color material amounts into the ink amount as the actual color material amount, it is sufficient to perform processing as follows. Here, explanation is given by taking a case where the RGB values at an input image signal point Q" are (30, 150, 180) as an example.

First, the virtual color material amounts at a white primary point (255, 255, 255), a cyan primary point (0, 255, 255), a blue primary point (0, 0, 255), and a black primary point (0, 0, 0) as predetermined points are acquired (S2301). Next, the virtual color material amounts at the points on the line connecting the predetermined points, which are necessary for determining the virtual color material amount at the point Q", are determined (S2302). Here, the RGB values at the point Q" are (30, 150, 180), and therefore, the points necessary in this case are three points, that is, a point Pc (30, 255, 255), a point Pb (30, 30, 255), and a point Pk (30, 30, 30). Then, it is possible to obtain the virtual color material amount at the point Pc (30, 255, 255) from the virtual color material amount at the white primary point and the virtual color material amount at the cyan primary point by using expression (11-1) to expression (11-3) described previously. Similarly, from the virtual color material amounts at the white primary point and the black primary point, the virtual color material amount at the point Pb can be obtained and from the virtual color material amounts at the white primary point and the black primary point, the virtual color material amount at the point Pk can be obtained.

Next, on the plane made up of the lines connecting the predetermined points, the virtual color material amounts at the points, which are necessary for determining the virtual color material amount at the point Q", are determined (S2303). Here, the RGB values at the point Q" are (30, 150, 180), and therefore, the points necessary in this case are two points, that is, a point Q (30, 180, 180) and a point Q' (30, 30, 180). It is possible to find the virtual color material amount at the point Q (30, 180, 180) from the virtual color material amount at the point Pc (30, 255, 255) and the virtual color material amount at the point Pk (30, 30, 30). For example, in the case where the virtual color material amount is found by linear interpolation, it may be possible to use expression (11''') below.

$$Q\_Vi = Pc\_Vi + (Pk\_Vi - Pc\_Vi) \times x/L \qquad \text{expression (11''')}$$

Here, $L = ((30-30)^2 + (255-180)^2 + (255-180)^2)^{(1/2)} \approx 318.2$. Further, $x = ((30-30)^2 + (255-30)^2 + (255-30)^2)^{(1/2)} \approx 106.1$. Similarly, it is possible to derive the virtual color material amount at the point Q' (30, 30, 180) from the virtual color material amount at the point Pb (30, 30, 255) and the virtual color material amount at the point Pk (30, 30, 30). Lastly, the virtual color material amount at the point Q" (30, 150, 180) is derived from the virtual color material amount at the point Q (30, 180, 180) and the virtual color material amount at the point Q' (30, 30, 180).

As described above, in the case where each time an image signal is input, the color conversion processing unit 102 derives the virtual color material amounts and converts the virtual color material amounts into the ink amount, it is sufficient to find the virtual color material amounts for the points necessary for the processing.

Figure 24B:
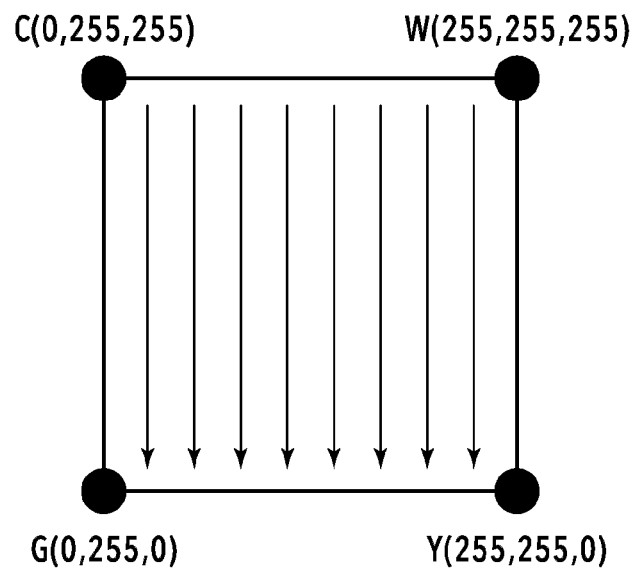
FIG. 24B is a diagram showing the way a virtual color material amount on a plane is determined.
Figure 25A:
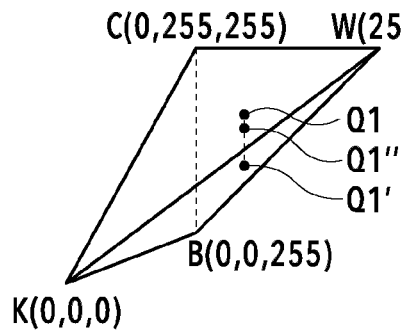
FIG. 25A is a diagram explaining the way a color cube is divided into six tetrahedrons and a virtual color material amount inside the tetrahedron is derived independently for each tetrahedron.
Figure 25B:
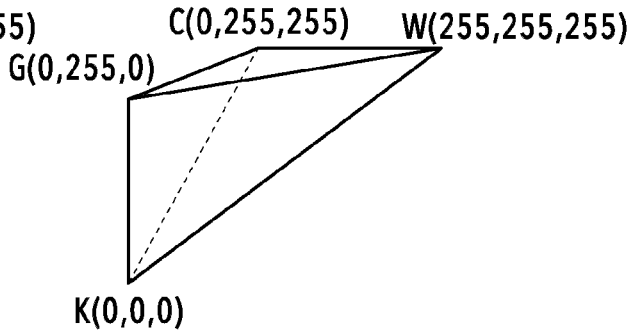
FIG. 25B is a diagram explaining the way the color cube is divided into the six tetrahedrons and a virtual color material amount inside the tetrahedron is derived independently for each tetrahedron.
Figure 25C:
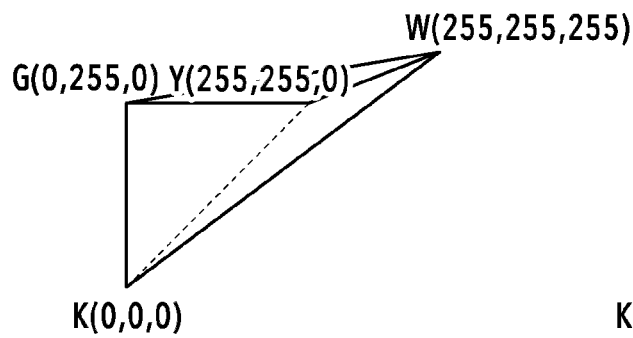
FIG. 25C is a diagram explaining the way the color cube is divided into the six tetrahedrons and a virtual color material amount inside the tetrahedron is derived independently for each tetrahedron.
Figure 25D:
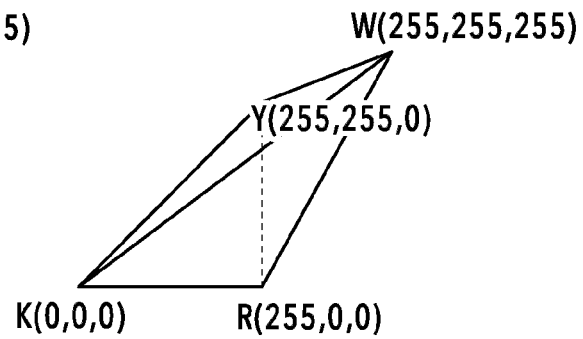
FIG. 25D is a diagram explaining the way the color cube is divided into the six tetrahedrons and a virtual color material amount inside the tetrahedron is derived independently for each tetrahedron.
Figure 25E:
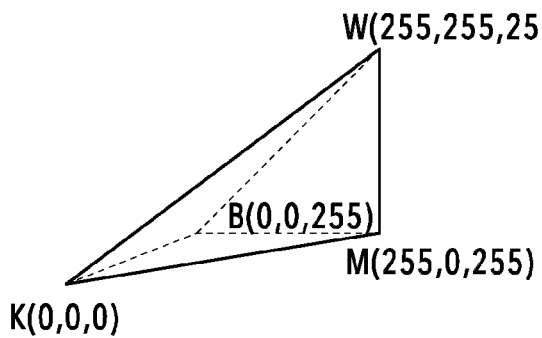
FIG. 25E is a diagram explaining the way the color cube is divided into the six tetrahedrons and a virtual color material amount inside the tetrahedron is derived independently for each tetrahedron.
Figure 25F:
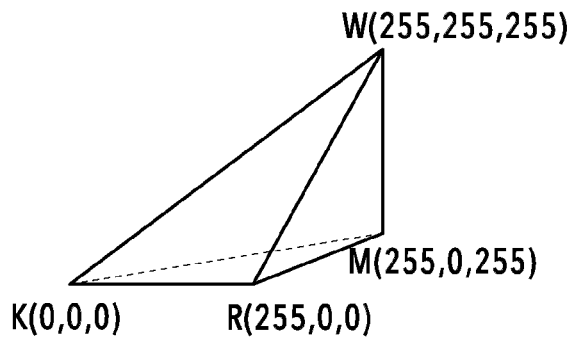
FIG. 25F is a diagram explaining the way the color cube is divided into the six tetrahedrons and a virtual color material amount inside the tetrahedron is derived independently for each tetrahedron.

The table creation method in the case where the virtual color material amount derivation processing is performed in advance and the results are held in a table is not limited to the above-described example and it is only required to be capable of obtaining a table giving a smooth change in the virtual color material amount within the color cube. For example, it may also be possible to derive the virtual color material amounts on the plane, whose G value is the same, for G=0 to 255 after determining the virtual color material amounts on the line connecting the predetermined points. In this case, for example, it is sufficient to determine the virtual color material amounts by a higher-order function or interpolation processing for the perpendicular dropped from the W-C line to the G-Y line as shown in FIG. 24B. Further, it may also be possible to determine the virtual color material amount that changes from white to cyan first, and then to determine the other virtual color material amounts by using interpolation processing by supposing that the G value and the B value change by the same amount in the case where the R value is fixed.

Furthermore, it may also be possible to define the color material amounts at predetermined points including at least the eight vertexes of the color cube and to determine all the color material amounts within the color cube from the color material amounts at those predetermined points by the publicly known interpolation processing, such as bilinear interpolation and a bicubic interpolation.

According to the present embodiment, even in the case where the input RGB value is raised to the power of a different γ value or raised to the power of a different S-shaped gamma in a high-saturation area, it is possible to easily find the virtual color material amount corresponding to an RGB value other than those on each axis of RGB. Due to this, the degree of freedom in designing color conversion characteristics by a designer increases.

Fourth Embodiment

In the first embodiment, the virtual color material amounts that satisfy the target block density in accordance with the input image signal are converted into the ink amount of each ink used in the image forming apparatus 200 in accordance with the priority of conversion determined in advance. However, there is a case where the ink that should be used with priority is different depending on the hue, saturation, and brightness. For example, on the line connecting white and black (gray line), priority should be given to the comparatively pale-color ink of gray, pale-color cyan, pale-color magenta and so on in order to make excellent the granularity and color constancy. Further, in a high-saturation area of red, blue and so on, priority should be given to the ink having a high density and a high saturation. That is, in a high-saturation area (for example, line connecting white and blue) or a low-brightness area (in addition to the above-described gray line, line connecting blue and black and the like), there is a case where it is better to make different the priority of conversion of ink.

Consequently, an aspect is explained as a fourth embodiment in which the priority of conversion of ink is specified for each line connecting between primary points (hereinafter, "primary line") and the ink amount for the primary line is determined first in accordance with each priority of conversion. In the following, conversion processing from the virtual color material amounts into the ink amount, which is a feature of the present embodiment, is explained mainly.

Figure 26:
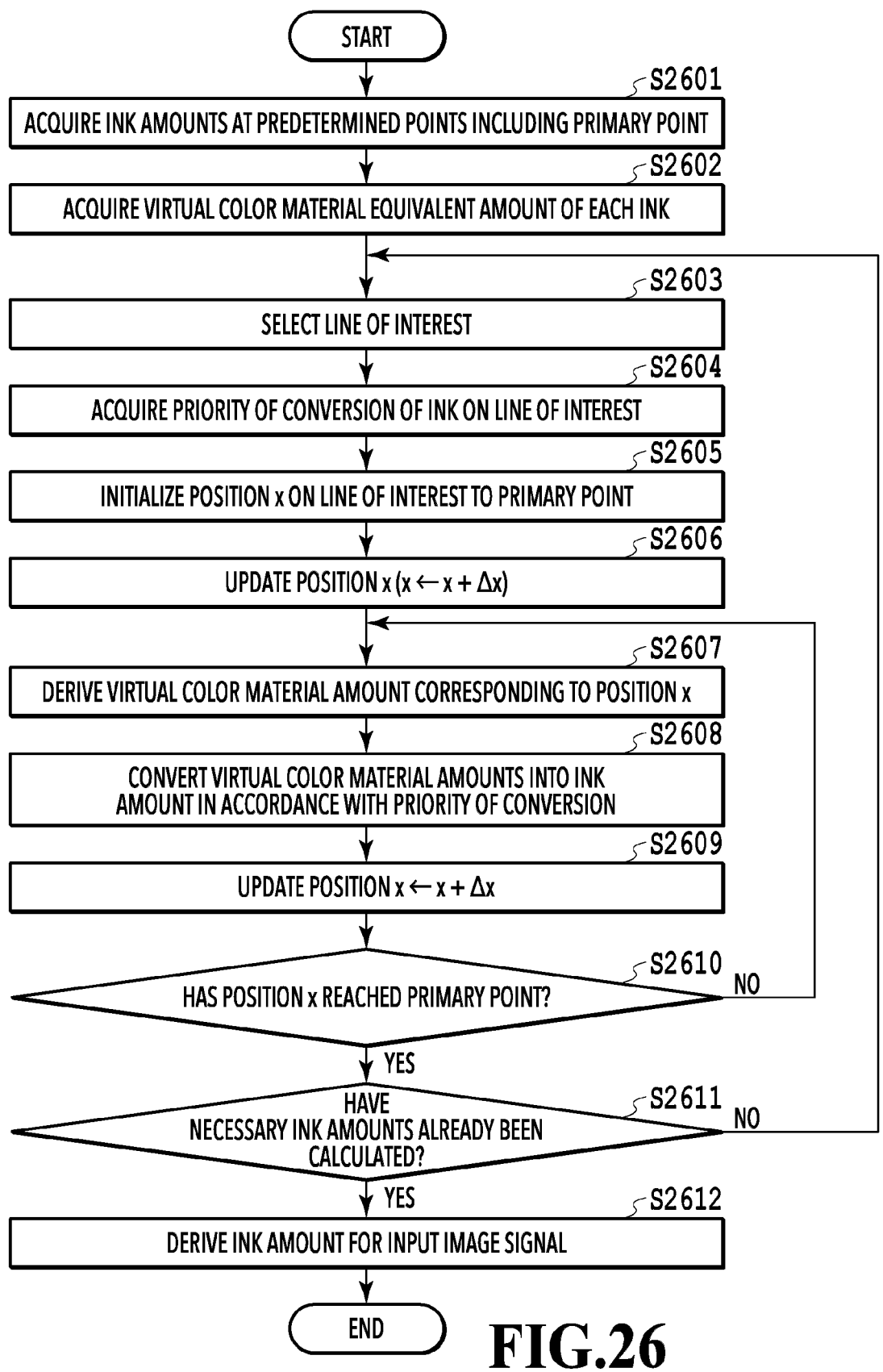
FIG. 26 is a flowchart showing a flow of processing to convert virtual color material amounts into an ink amount.

In the present embodiment, the priority of conversion of ink is acquired for each primary line and first, the ink amount for each primary line is determined. After this, the ink amount on the plane connecting each primary line is determined by using a publicly known higher-order function, linear interpolation and so on. Lastly, by finding the ink amount inside the color cube (see FIG. 2) from the ink amount on the plane, the ink amount of the entire color space is determined. At the time of determination, the ink amount is determined while keeping the relationship between the input image signal and the virtual color material amount (that increases monotonically and causes no inflection point to occur or whose number of inflection points is as small as possible). FIG. 26 is a flowchart showing a flow of processing to convert the virtual color material amounts into the ink amount according to the present embodiment. In the following, detailed explanation is given.

First, at step 2601, the ink amounts for predetermined points including the eight primary points, which are the vertexes of the above-described color cube, are acquired. For a point other than the primary points, for example, the ink amount at the midpoint of the primary line is acquired. In order to acquire the ink amount, for example, it is sufficient to find the ink amount in accordance with the processing at each of step 904 and subsequent steps in the flow in FIG. 9 according to the first embodiment after a designer gives the priority of conversion for each primary point. It is recommended to make the priority of conversion given by a designer differ in accordance with the primary point. For example, for the cyan primary point, it is possible to extend the color area in the cyan direction by making high the priority of the cyan ink or the light cyan ink. Similarly, it is preferable to make high the priority of the black ink for the black primary point and to make high the priority of the blue ink or the cyan and magenta inks for the blue primary point. Alternatively, it may also be possible for a designer to directly determine the ink amount that satisfies the virtual color material amount at each primary point (derived at S301). Then, it may also be possible to inversely calculate the virtual color material amount from the determined ink amount and to take the virtual color material amount obtained by the inverse calculation as the virtual color material amount at the primary point in accordance with the third embodiment described previously.

At step 2602, the virtual color material equivalent amounts of all the inks used in the image forming apparatus 200 are acquired. This step corresponds to step 902 in the flow in FIG. 9 according to the first embodiment and there is not a different portion in particular, and therefore, explanation is omitted.

At step 2603, from a plurality of lines connecting the predetermined points corresponding to the ink amounts acquired at step S2601, one line is selected as a line of interest. For example, it is assumed that the ink amounts at the eight primary points are acquired at step 2601. At this time, the number of primary lines connecting each primary point is 28. From these 28 primary lines, for example, the W-K line is selected as the first line of interest.

Then, by the processing at each of step 2604 to step 2610, the ink amount on the line of interest is determined. For simplicity, explanation is given by assuming that each ink amount is acquired at step 2601 described above in the case where the eight primary points are taken to be predetermined points.

At step 2604, the priority of conversion on the selected line of interest is acquired. The priority in this case is determined as follows. First, the maximum value of the virtual color material equivalent amounts Vyi_x, Vmi_x, and Vci_x of the inks corresponding to the primary points located at both ends of the line of interest is acquired. The ink corresponding to the primary point means the ink whose ink amount acquired at step 2601 is larger than 0[%]. Then, priority is determined so that the priority of the ink whose maximum value of the virtual color material equivalent amount is low is made high. At this time, in the case where the ink itself does not correspond to the primary point but the ink that exhibits the same hue corresponds to the primary point, the priority of the ink may be made high. For example, in the case where the black ink corresponds to the primary point, it may also be possible to make high the priority of the gray ink whose hue is the same as that of the black. Further, for the ink that does not correspond to the primary point is given priority second to the priority of the ink corresponding to the primary point. At this time, it is sufficient to determine the priority of the ink not corresponding to the primary point also based on the maximum value of the virtual color material equivalent amount. Alternatively, it may also be possible not to use the ink for the target primary line without giving priority to the ink not corresponding to the primary point. Here, explanation is given by using a specific example. Here, it is assumed that the line of interest is the W-C line and the ink corresponding to the white primary point does not exist, and the cyan ink and the light cyan ink exist as the inks corresponding to the cyan primary point. The inks corresponding to the primary points at both ends are the cyan ink and the light cyan ink, and therefore, the priority of conversion thereof is made high. Specifically, the priority is determined so that the priority is high in the order of light cyan, cyan, gray, light magenta, magenta, yellow, and black. Alternatively, as described above, it may also be possible to give priority only to light cyan and cyan and not to give priority to the other colors.

At step 2605, one of the primary points at both ends on the line of interest is set as the initial position of a position x at which the virtual color material amounts are converted into the ink amount. For example, in the case where the W-K line is the line of interest, the position x is initialized to the white primary point.

At step 2606, the position x is updated by moving the position x by Δx (x=x+Δx). At this time, as Δx, a value obtained by equally dividing the line of interest (here, W-K line) by, for example, 255 is used. However, the divisor is not limited to 255 but may be 16 or 65535.

At step 2607, the virtual color material amounts for the position x are derived. At this time, the virtual color material amounts are found in accordance with, for example, expression (2-1) to expression (2-3) and expression (3-1) to expression (3-3) in the first embodiment, or step 2301 and step 2302 of the flow in FIG. 3 in the third embodiment.

At step 2608, in accordance with the priority of conversion on the line of interest acquired at step 2604, the ink amount of each ink used in the image forming apparatus 200 is determined. Specifically, in accordance with of the processing at each of step 904 to step 910 of the flow in FIG. 9 in the first embodiment, the virtual color material amounts are converted into the ink amount. At this time, it may also be possible to determine the ink amount only from the amount of the virtual color material whose change is larger, that is, the virtual color material that mainly changes on the line of interest based on the virtual color material amounts at the primary points at both ends. For example, it is assumed that the virtual color material amounts at the white primary point derived in accordance with expression (2-1) to expression (2-3) and expression (3-1) to expression (3-3) described previously are Vyi=0.0, Vmi=0.0, and Vci=0.0. Similarly, it is assumed that the virtual color material amounts at the cyan primary point are Vyi=0.0, Vmi=0.0, and Vci=2.0. At this time, on the W-C line, the virtual color material amounts Vyi and Vmi do not change and remain at 0.0 and only the virtual color material amount Vci changes. Consequently, on the W-C line, the combination of the ink amounts that causes Vci to coincide is determined in accordance with only the priority of conversion and the ink total amount limit Max_W. Here, in the case where it is assumed that the priority of the light cyan ink is the highest, it is sufficient to determine the ink amount from the virtual color material amount Vci at the position x and a virtual color material equivalent amount Vci_1 of the light cyan ink. In this case, the ink amount Wlc that satisfies Vci=Vci_lc×Wlc is determined as the ink amount of the light cyan ink. In the case where the ink amount Wlc of the light cyan thus determined is larger than the ink total amount limit Max_W, it is sufficient to perform processing to replace the light cyan ink with the cyan ink whose hue is the same and whose priority is lower. That is, it is sufficient to determine the ink amount Wc of the cyan ink and the ink amount Wlc of the light cyan ink so that Wc+Wlc=Max_W and Wc×Vci_c+Wlc×Vci_lc hold.

At step 2609, as in the case of step 2606 described above, the position x is updated by moving the position x by Δx.

At step 2610, whether or not the position x has reached the primary point is determined. For example, in the case where the line of interest is the W-K line and the white primary point is taken to be the initial position of the position x, whether or not the position x has reached the black primary point is determined. In the case where the results of the determination indicate that the position x has reached the primary point, this means that all the ink amounts on the line of interest have been determined, and therefore, the processing advances to step 2611. On the other hand, in the case where the position x has not reached the primary point yet, the processing returns to step 2607 and the ink amount at the next position x is determined.

At step 2611, whether all the ink amounts necessary for the next step 2612 have been determined is determined. For example, in the case where all the color conversion LUTs are possessed for the input RGB value, whether or not all the ink amounts on the above-described total of 28 primary lines have been determined is determined. In the case where each time the image signal is input, the color conversion processing unit 102 derives the virtual color material amounts and converts the derived virtual color material amounts into the ink amount, it is only required for the ink amounts at the points necessary for the input image signal to be determined. For example, in the case where the input image signal Q"=(30, 150, 180), it is only required that the three points, that is, the point Pc (30, 255, 255), the point Pb (30, 30, 255), and the point Pk (30, 30, 30) have already been determined as the necessary points.

At step 2612, the ink amount for the input image signal (RGB value) is derived. For example, the ink amount is determined by a higher-order function or publicly known interpolation processing, such as linear interpolation, in accordance with the derivation procedure of the virtual color material amount in the third embodiment described previously. More specifically, in accordance with step 2303 of the flow in FIG. 23 in the third embodiment, the ink amount on the plane surrounded by the lines for which the ink amounts have already been determined is derived. Further, it is sufficient to derive the ink amount inside the color cube from the ink amount on the above-described plane in accordance with step 2304 of the same flow.

Alternatively, it may also be possible to determine the ink amount on the above-described plane or the ink amount inside the color cube in accordance with the priority of conversion as in the case of step 2608 described above. For example, it may also be possible to determine the priority of conversion at the point P''' shown in FIG. 24A described previously from the ink amounts at the point P1 and the point P1' and to determine the ink amount in accordance with the priority of conversion. At this step, it is sufficient to determine the priority of conversion as in the case of step 2604 and to determine the ink amount in accordance with step 2608. Here, an example is shown. It is premised that the ink amounts at the point P1 are cyan: 70[%], light cyan: 20[%], and the other inks: 0[%]. It is also premised that the ink amounts at the point P1' are black: 90[%], gray: 10[%], and the other inks: 0[%]. Then, each ink of cyan, light cyan, black, and gray corresponding to the point P1 and the point P1' is given priority based on the maximum value of the virtual color material equivalent amount. Here, it is assumed that priority is high in the order of gray, light cyan, cyan, and black. Then, from the RGB value at the point P1", the virtual color material amounts are derived. At this time, it may also be possible to find the virtual color material amounts from the virtual color material amounts at the point P1 and the point P1' by interpolation processing or a function in place of finding the virtual color material amounts from the RGB value. For example, in the case of linear interpolation, the virtual color material amounts are derived as follows. Here, it is assumed that the virtual color material amounts for the point P1 are Vyi=0[%], Vmi=0[%], and Vci=90[%]. Further, it is assumed that the virtual color material amounts for the point P1' are Vyi=80[%], Vmi=80[%], and Vci=80[%]. At this time, in the case where the point P1" is the midpoint of the point P1 and the point P1', it is possible to derive the virtual color material amounts as Vyi=(80+0)/2=40[%], Vmi=(80+0)/2=40[%], and Vci=(90+80)/2=85[%].

Modification Example

In the present embodiment, it is possible determine the ink amount on the primary line independently for each line. Consequently, it is not necessarily required to select the W-K line as the first primary line. For example, it may also be possible to select the W-C line first or to select the B-K line first.

Further, on the primary line connecting opposite colors, the midpoint of the line is achromatic. In this case, it may also be possible to determine the ink amount by acquiring the ink amount by taking the midpoint that is achromatic to be the predetermined point at step 2601 and by dividing the primary line connecting the opposite colors. For example, it may also be possible to acquire the ink amount by adding the ink amount of gray at the midpoint, which is achromatic, to the primary point on the R-C line. At this time, the R-C line is divided into the R-GY line and the C-GY line and the ink amounts are independently determined, respectively. Similarly, on the lines connecting the cyan, magenta, and yellow primary points, it may also be possible to acquire the ink amounts by taking the midpoint as the predetermined point and to divide the primary line. For example, in the case of the C-M line, it may also be possible to determine the ink amount on the line by dividing the C-M line into the C-B line and the B-M line.

Further, in the present embodiment, the priority of conversion is given only to the inks each of which is actually used in the image forming apparatus 200. However, it is also possible to give the priority of conversion to the secondary color or tertiary color. For example, it may also be possible to give the virtual color material equivalent amount and the priority of conversion by regarding composite black formed by mixing the cyan ink, the magenta ink, and the yellow ink in a predetermined ratio as being pseudo black ink. Alternatively, it may also be possible to give the priority of conversion to composite red ink formed by mixing the yellow ink and the magenta ink in a predetermined ratio.

Further, it may also be possible to change priority in accordance with the position x even on the same line of interest. For example, on the C-M line, the nearer to the cyan primary point, the higher priority is given to the cyan ink, the nearer to the midpoint, the higher priority is given to the light cyan ink and the light magenta ink, the nearer to the magenta primary point, the higher priority is given to the magenta ink, and so on. However, there is a possibility that discontinuity occurs in the ink amount in the area where the priority switches to another. Consequently, in the case where the priority is changed in accordance with the position x, it is desirable to smooth the ink amount in accordance with the second embodiment described previously. By determining the priority of conversion by referring to the ink corresponding to the primary point in this manner, the use of ink whose saturation is low or ink whose color is a complementary color is suppressed, and therefore, it is possible to implement smooth gradation properties while extending the color area. For example, on the W-C line, the amounts of black ink and gray ink are suppressed and the saturation of the W-C line increases.

According to the present embodiment, by setting the priority of conversion of ink for each primary line and determining the ink amount of each primary line first, it is possible to easily make different the ink that should be used with priority in accordance with the saturation or brightness. Further, by determining the ink amount on the plane connecting each primary line and the ink amount inside the color cube connecting planes by using a publicly known higher-order function, linear interpolation and so on, it is possible to reduce discontinuity of gradation of the entire color conversion.

Other Embodiments

It is also possible to implement the present invention by processing in which programs that implement one or more functions of the above-described embodiments are supplied to a system or an apparatus via a network or a storage medium and one or more processors in a computer of the system or the apparatus read and execute the programs. Further, it is also possible to implement the present invention by a circuit (for example, ASIC) that implements one or more functions.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

The present invention is explained by referring to the embodiments, but it is needless to say that the present invention is not limited to the above-described embodiments. The following claims are to be accorded the broadest interpretation so as to encompass all such modifications and equivalent structures and functions.

According to the color conversion processing of the present invention, it is possible to obtain favorable gradation properties in the entire color space from the shadow area to the highlight area.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A color conversion processing apparatus that converts an input image signal value into an output value of an actual color material used in an image forming apparatus, the color conversion processing apparatus comprising:
one or more processors; and
one or more memories storing instructions, when executed by the one or more processors, causing the color conversion processing apparatus to function as:
a derivation unit configured to derive color material amounts corresponding to the input image signal value for a plurality of virtual color materials smaller in number than the number of actual color materials; and
a conversion unit configured to convert the derived color material amounts of the plurality of virtual color materials into the output values of the actual color materials, wherein
each of the plurality of virtual color materials has a density corresponding to each wavelength band obtained by dividing a wavelength range reproduced by the actual color materials being output into a plurality of wavelength bands, and
the derivation unit derives the color material amounts corresponding to the input image signal value so that the relationship between the input image signal value and the color material amounts is one that increases or decreases monotonically and causes no inflection point to occur, based on the density corresponding to each of the wavelength bands for the plurality of virtual color materials.

2. The color conversion processing apparatus according to claim 1, wherein
each of the plurality of virtual color materials has a density corresponding to each wavelength band obtained by dividing a wavelength range reproduced by the actual color materials being output into wavelength bands whose number is not less than three and smaller than the number of actual color materials.

3. The color conversion processing apparatus according to claim 2, wherein
the plurality of virtual color materials does not have a density for a wavelength band other than a corresponding wavelength band of each of the wavelength bands.

4. The color conversion processing apparatus according to claim 2, wherein
the derivation unit determines the color material amounts of the plurality of virtual color materials so that the density corresponding to each of the wavelength bands changes linearly for the input image signal value.

5. The color conversion processing apparatus according to claim 1, wherein the one or more memories storing instructions, when executed by the one or more processors, causes the information processing apparatus to further function as:
an acquisition unit configured to acquire equivalent values in terms of the plurality of virtual color materials per unit amount of the actual color material for each actual color material, wherein
the conversion unit determines the output value of each of the actual color materials based on the equivalent values with the color material amounts of the plurality of virtual color materials as a target.

6. The color conversion processing apparatus according to claim 1, wherein
the conversion unit converts the color material amounts of the plurality of virtual color materials into the output value of the actual color material in accordance with priority of conversion set to each actual color material.

7. The color conversion processing apparatus according to claim 6, wherein
the priority of conversion is set in accordance with the density of each of the actual color materials.

8. The color conversion processing apparatus according to claim 6, wherein
the conversion unit finds a plurality of output values that causes the color material amounts of the plurality of virtual color materials to coincide in an actual color material of interest selected in accordance with the priority of conversion from each of the actual color materials and determines the output value of the actual color material of interest from the plurality of output values that is caused to coincide in accordance with characteristics of the actual color material of interest.

9. The color conversion processing apparatus according to claim 8, wherein
the conversion unit determines the output value corresponding to the maximum value of the equivalent values of the actual color material of interest of the plurality of output values that is caused to coincide as the output value of the actual color material of interest.

10. The color conversion processing apparatus according to claim 8, wherein
the conversion unit determines the minimum value of the plurality of output values that is caused to coincide as the output value of the actual color material of interest.

11. The color conversion processing apparatus according to claim 6, wherein
the conversion unit performs control so that, in a case where a value obtained by accumulating the output value of each actual color material determined by the conversion exceeds a predetermined limit value, the accumulated value of the output value of each of the actual color materials does not exceed the limit value by replacing the output value of an actual color material whose priority is higher in the priority of conversion with the output value of an actual color material whose priority is lower for a plurality of actual color materials exhibiting substantially the same hue.

12. The color conversion processing apparatus according to claim 11, wherein
at a point in time at which all the output values of each of the actual color materials are determined, at least one color material amount of the color material amounts of the plurality of virtual color materials coincides with a total value of the determined color material amounts of the virtual color materials by each of the actual color materials.

13. The color conversion processing apparatus according to claim 1, wherein the one or more memories storing instructions, when executed by the one or more processors, causes the information processing apparatus to further function as:
a smoothing unit configured to perform smoothing processing for the output value of each actual color material determined by the conversion unit.

14. The color conversion processing apparatus according to claim 13, wherein
the input image signal is three channels of RGB, and
the smoothing unit performs the smoothing processing so that the output value of the actual color material at each vertex does not change by using a smoothing filter whose filter size at each of the vertexes of an RGB cube is 0.

15. The color conversion processing apparatus according to claim 1, wherein
the input image signal is three channels of RGB, and
the derivation unit finds the color material amounts of the plurality of virtual color materials on each axis of an RGB cube and determines the color material amounts of the plurality of virtual color materials between axes of the RGB cube by interpolation processing using the found output values.

16. The color conversion processing apparatus according to claim 6, wherein
the input image signal is three channels of RGB, and
the conversion unit determines the output value of the actual color material on each line in accordance with priority of conversion set for each line connecting each vertex of an RGB cube, then determines the output value of the actual color material on a plane connecting each line, and then determines the output value of the actual color material inside the RGB cube.

17. A color conversion processing method of converting an input image signal value into an output value of an actual color material used in an image forming apparatus, the method comprising:
a derivation step of deriving color material amounts corresponding to the input image signal value for a plurality of virtual color materials smaller in number than the number of actual color materials; and
a conversion step of converting the derived color material amounts of the plurality of virtual color materials into the output values of the actual color materials, wherein
each of the plurality of virtual color materials has a density corresponding to each wavelength band obtained by dividing a wavelength range reproduced by the actual color materials being output into a plurality of wavelength bands, and
at the derivation step, the color material amounts of the plurality of virtual color materials corresponding to the input image signal value are derived so that the relationship between the input image signal value and the color material amounts is one that increases or decreases monotonically and causes no inflection point to occur, based on the density corresponding to each of the wavelength bands.

18. A method of creating a color conversion LUT for converting an input image signal value into an output value of an actual color material used in an image forming apparatus, the method comprising:
a derivation step of deriving color material amounts corresponding to the input image signal value for a plurality of virtual color materials smaller in number than the number of actual color materials;
a conversion step of converting the derived color material amounts of the plurality of virtual color materials into the output values of the actual color materials, and
a creation step of creating a color conversion LUT in which the converted output values of the actual color materials and the input image signal value are associated with each other, wherein
each of the plurality of virtual color materials has a density corresponding to each wavelength band obtained by dividing a wavelength range reproduced by the actual color materials being output into a plurality of wavelength bands, and
at the derivation step, the color material amounts of the plurality of virtual color materials corresponding to the input image signal value are derived so that the relationship between the input image signal value and the color material amounts is one that increases or decreases monotonically and causes no inflection point to occur, based on the density corresponding to each of the wavelength bands.

19. A color conversion processing apparatus that converts an input image signal value into an output value of an actual color material used in an image forming apparatus by using a color conversion LUT created by a method specified by the following steps, the method comprising:
a derivation step of deriving color material amounts corresponding to the input image signal value for a plurality of virtual color materials smaller in number than the number of actual color materials;
a conversion step of converting the derived color material amounts of the plurality of virtual color materials into the output values of the actual color materials, and
a creation step of creating a color conversion LUT in which the converted output values of the actual color materials and the input image signal value are associated with each other, wherein
each of the plurality of virtual color materials has a density corresponding to each wavelength band obtained by dividing a wavelength range reproduced by the actual color materials being output into a plurality of wavelength bands, and
at the derivation step, the color material amounts of the plurality of virtual color materials corresponding to the input image signal value are derived so that the relationship between the input image signal value and the color material amounts is one that increases or decreases monotonically and causes no inflection point to occur, based on the density corresponding to each of the wavelength bands.

20. A non-transitory computer readable storage medium storing a program for causing a computer to perform a method of creating a color conversion LUT for converting an input image signal value into an output value of an actual color material used in an image forming apparatus, the method comprising:
a derivation step of deriving color material amounts corresponding to the input image signal value for a plurality of virtual color materials smaller in number than the number of actual color materials;
a conversion step of converting the derived color material amounts of the plurality of virtual color materials into the output values of the actual color materials, and
a creation step of creating a color conversion LUT in which the converted output values of the actual color materials and the input image signal value are associated with each other, wherein
each of the plurality of virtual color materials has a density corresponding to each wavelength band obtained by dividing a wavelength range reproduced by the actual color materials being output into a plurality of wavelength bands, and
at the derivation step, the color material amounts of the plurality of virtual color materials corresponding to the input image signal value are derived so that the relationship between the input image signal value and the color material amounts is one that increases or decreases monotonically and causes no inflection point to occur, based on the density corresponding to each of the wavelength bands.

21. The color conversion processing apparatus according to claim 1, wherein the derivation unit sets a density corresponding to each of the wavelength bands which is a target as a target block density for the input image signal value, and derives the color material amounts of the virtual color materials based on the target block density.

22. The color conversion processing apparatus according to claim 21, wherein the derivation unit derives the color material amounts of the virtual color materials for implementing the target block density in accordance with Lambert's law.

23. The color conversion processing apparatus according to claim 21, wherein the conversion unit determines the output values of each of the actual color materials by using a preset correspondence relation between the color material amounts of the virtual color materials and the color material amounts of the actual color materials.

24. The color conversion processing apparatus according to claim 1, wherein the conversion unit performs the conversion while the relationship is maintained.

* * * * *